US012658830B2

(12) United States Patent　　(10) Patent No.: US 12,658,830 B2

Kotikelapudi et al.　　(45) Date of Patent: Jun. 16, 2026

(54) METHODS AND APPARATUS TO SENSE CHANGES IN A LOAD OF A STEPPER MOTOR

(71) Applicant: Texas Instruments Incorporated, Dallas, TX (US)

(72) Inventors: Venkata Naresh Kotikelapudi, Bangalore (IN); Laxman Sreekumar, Thrissur (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 67 days.

(21) Appl. No.: 18/525,348

(22) Filed: Nov. 30, 2023

(65) Prior Publication Data

US 2025/0183824 A1　　Jun. 5, 2025

(51) Int. Cl.
*H02P 8/12*　　(2006.01)

(52) U.S. Cl.
CPC ...................................... *H02P 8/12* (2013.01)

(58) Field of Classification Search
CPC ...................................... H02P 8/12; H02P 8/34
USPC .................................. 318/696, 685, 671, 560
See application file for complete search history.

(56) References Cited

U.S. PATENT DOCUMENTS

| | | | |
|---|---|---|---|
| 7,323,838 B2 * | 1/2008 | Ma | H02P 7/29 318/599 |
| 8,952,646 B2 * | 2/2015 | O'Neil | H02P 8/36 318/696 |
| 2023/0097035 A1 * | 3/2023 | Kotikelapudi | H02P 8/12 318/696 |

* cited by examiner

*Primary Examiner* — David Luo

(74) *Attorney, Agent, or Firm* — Xianghui Huang; Frank D. Cimino

(57) ABSTRACT

An example apparatus includes: current driver circuitry configured to supply power to a stepper motor; and controller circuitry coupled to the current driver circuitry, the controller circuitry configured to: determine a first duty cycle of power transferred to the stepper motor by the current driver circuitry during a first operation of the stepper motor, the first operation to supply power using currents of a target magnitude; determine an previous duty cycle of power transferred to the stepper motor by the current driver circuitry during a second operation of the stepper motor, the second operation of the stepper motor to supply power using currents of the target magnitude; and determine changes in a mechanical load applied to the stepper motor responsive to a comparison of the first duty cycle to the previous duty cycle.

20 Claims, 13 Drawing Sheets

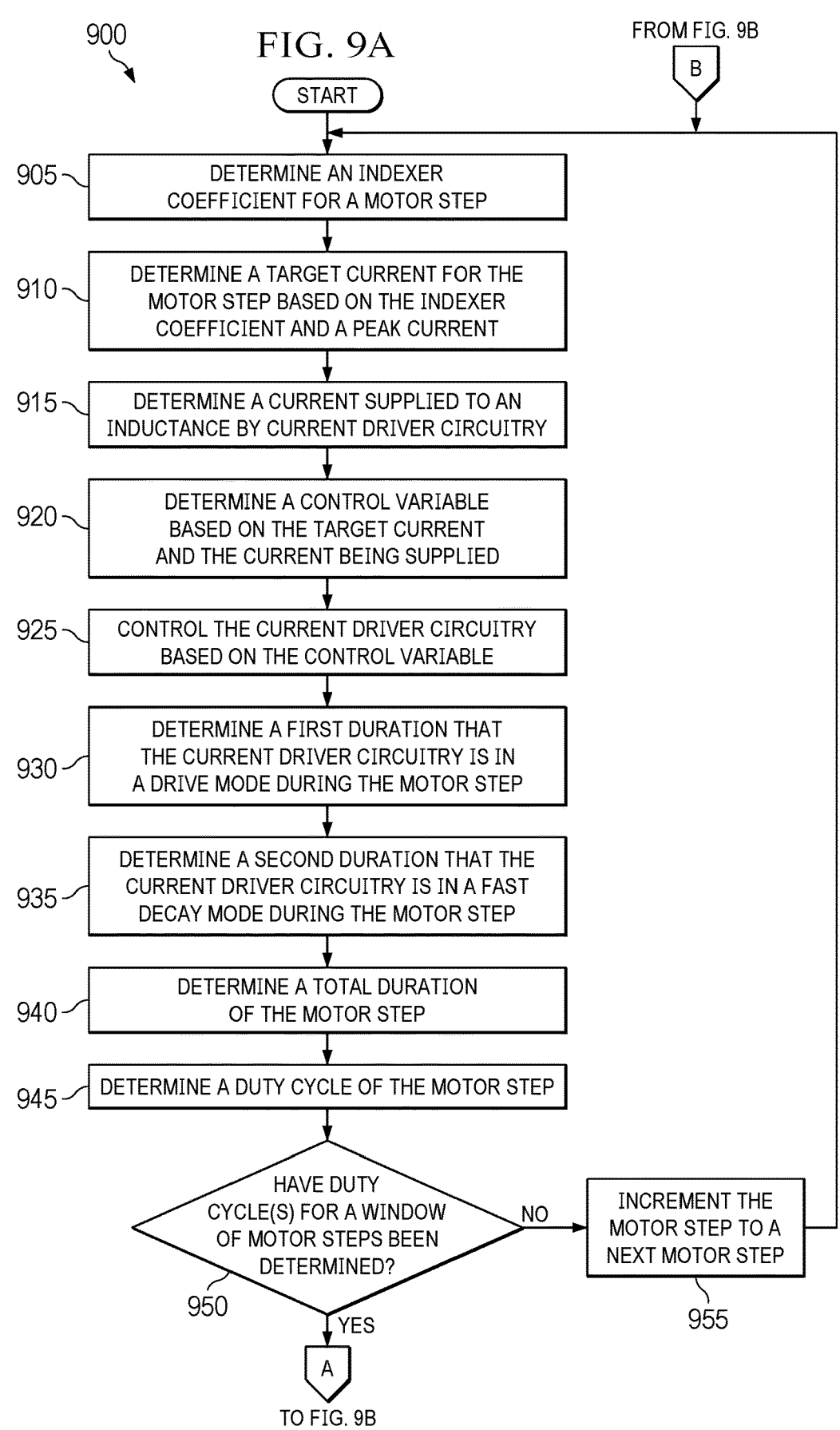

FROM FIG. 9B

B

START

905 — DETERMINE AN INDEXER COEFFICIENT FOR A MOTOR STEP

910 — DETERMINE A TARGET CURRENT FOR THE MOTOR STEP BASED ON THE INDEXER COEFFICIENT AND A PEAK CURRENT

915 — DETERMINE A CURRENT SUPPLIED TO AN INDUCTANCE BY CURRENT DRIVER CIRCUITRY

920 — DETERMINE A CONTROL VARIABLE BASED ON THE TARGET CURRENT AND THE CURRENT BEING SUPPLIED

925 — CONTROL THE CURRENT DRIVER CIRCUITRY BASED ON THE CONTROL VARIABLE

930 — DETERMINE A FIRST DURATION THAT THE CURRENT DRIVER CIRCUITRY IS IN A DRIVE MODE DURING THE MOTOR STEP

935 — DETERMINE A SECOND DURATION THAT THE CURRENT DRIVER CIRCUITRY IS IN A FAST DECAY MODE DURING THE MOTOR STEP

940 — DETERMINE A TOTAL DURATION OF THE MOTOR STEP

945 — DETERMINE A DUTY CYCLE OF THE MOTOR STEP

HAVE DUTY CYCLE(S) FOR A WINDOW OF MOTOR STEPS BEEN DETERMINED?

950

NO — INCREMENT THE MOTOR STEP TO A NEXT MOTOR STEP

955

YES

METHODS AND APPARATUS TO SENSE CHANGES IN A LOAD OF A STEPPER MOTOR

TECHNICAL FIELD

This description relates generally to motor control and, more particularly, to methods and apparatus to sense changes in a load of a stepper motor.

BACKGROUND

Electric motors continue to become increasingly common and complex. Electric motors convert electrical energy into mechanical energy used to drive a wide range of operations. In electric vehicles (EVs), mechanical energy from one or more electric motors accelerates the EV. In manufacturing, mechanical energy from one or more electric motors drives manufacturing operations. One common electric motor is a stepper motor. Some systems utilize a stepper motor to allow for accurate position control. For example, medical systems need to accurately sequence positions of the electric motor to control a supply of mechanical energy.

SUMMARY

For methods and apparatus to sense changes in a load of a stepper motor, an example apparatus includes current driver circuitry configured to supply power to a stepper motor; and controller circuitry coupled to the current driver circuitry, the controller circuitry configured to: determine a first duty cycle of power transferred to the stepper motor by the current driver circuitry during a first operation of the stepper motor, the first operation to supply power using currents of a target magnitude; determine an previous duty cycle of power transferred to the stepper motor by the current driver circuitry during a second operation of the stepper motor, the second operation of the stepper motor to supply power using currents of the target magnitude; and determine changes in a mechanical load applied to the stepper motor responsive to a comparison of the first duty cycle to the previous duty cycle.

BRIEF DESCRIPTION OF THE DRAWINGS

FIGS. 9A and 9B form a flowchart representative of example machine-readable instructions and/or example operations that may be executed, instantiated, and/or performed using an example programmable circuitry implementation of the duty cycle monitor circuitry of FIG. 6 and/or more generally the controller circuitry 155 of FIGS. 1, 2, and 6.

The same reference numbers or other reference designators are used in the drawings to designate the same or similar (functionally and/or structurally) features.

DETAILED DESCRIPTION

Figure 1:
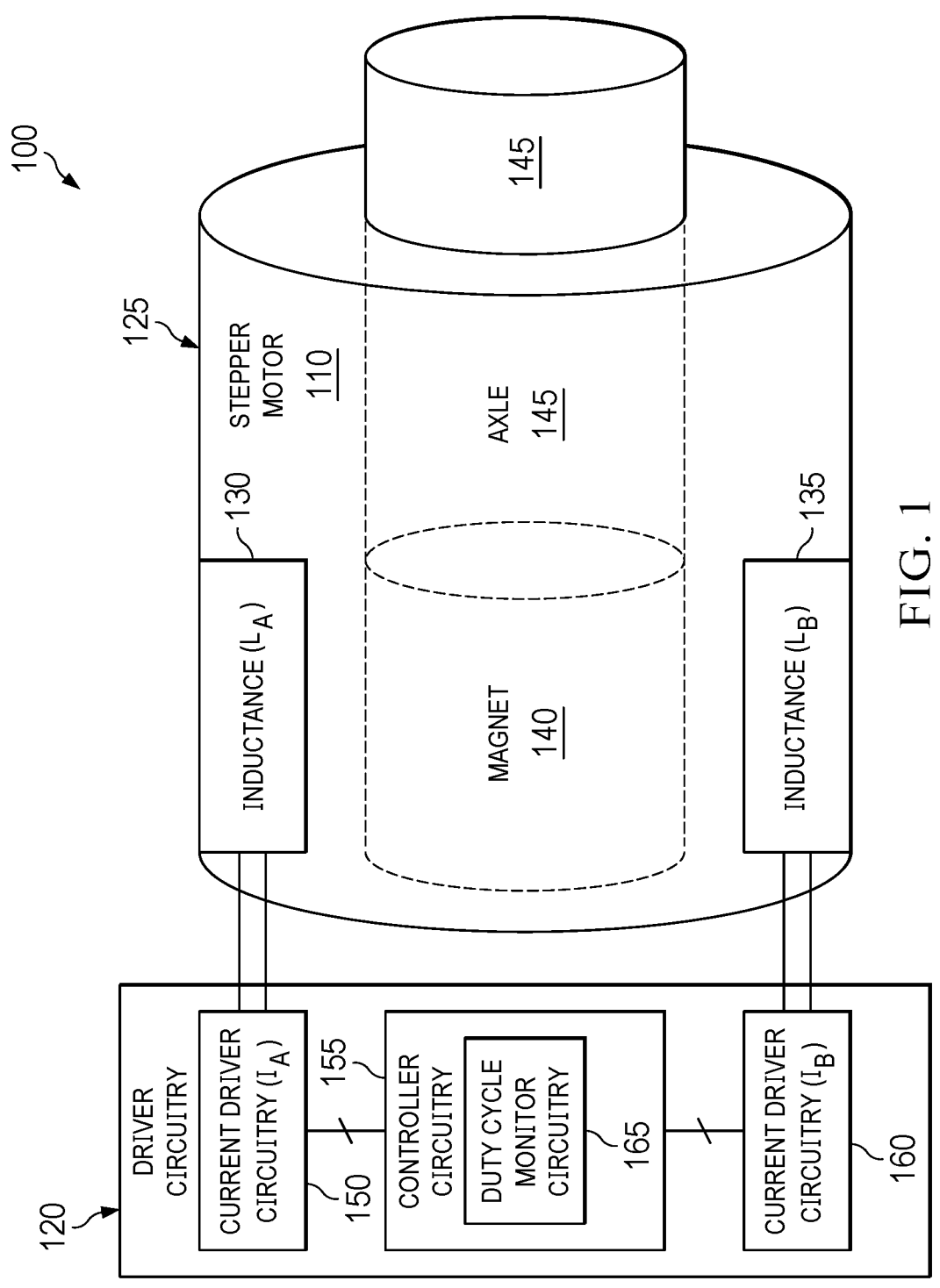
FIG. 1 is a block diagram of an example motor system including driver circuitry to supply electrical power to a stepper motor using current driver circuitry and controller circuitry.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Electric motors continue to become increasingly common and complex. Electric motors convert electrical energy into mechanical energy, such as a rotation. One type of electric motor is a stepper motor. Stepper motors include an axle, a magnet, and a plurality of inductances (e.g., coils, windings, etc.). Driver circuitry supplies currents to the stepper motors. When supplied a current, the inductances of the stepper motor rotate the axle by causing the magnet to change from a first position to a second position responsive to the current from the driver circuitry. Such a change in a positioning of the magnet is due to current flowing through the inductances creating a magnetic field that attracts and/or repels polarities of the magnet. The magnet is coupled to the axle to cause a rotation of the axle responsive to the rotation of the magnet. To accurately cause the rotation of the magnet, the driver circuitry sequences power supplied to each of the inductances.

In some devices, the driver circuitry sequences power supplied to the inductances of a stepper motor using a Sine wave. In such applications, the driver circuitry supplies power to a first inductance using a first Sine wave and a second inductance using a second Sine wave. To sequence the rotation of the magnet, the driver circuitry generates the second Sine wave as a phase shifted version of the first Sine wave. Ideally, the driver circuitry supplies a continuous time Sine wave to the inductances. However, driver circuitry, operating in discrete time, is incapable of generating a continuous time Sine wave. Instead, driver circuitry changes the amplitude of current supplied to the inductances over a series of discrete steps. As the driver circuitry progresses through the series of steps, the changes in the amplitude of the current resemble a Sine wave. Although using the series of steps is an effective alternative to supplying power as a continuous time Sine wave, causing a current through an inductance to a fixed value for a set duration of a step is relatively complex.

Driver circuitry includes current driver circuitry and controller circuitry. In some devices, the driver circuitry supplies current to one of the inductances of the stepper motor by setting a mode of operation of the current driver circuitry. In such applications, the controller circuitry controls the mode of operation of the current driver circuitry to achieve a target current. The current driver circuitry is capable of a drive mode of operation, a fast decay mode of operation, and a slow decay mode of operation.

The controller circuitry adjusts the current driver circuitry to the drive mode of operation to increase current flowing through the inductor. In such an example, the current driver circuitry sources a current through the inductance from a voltage source. Accordingly, when in the drive mode of operation, the current driver circuitry supplies power to the inductor. The controller circuitry keeps the current driver circuitry in the drive mode of operation until the current through the inductance is approximately equal to a target current of a given step.

Once the current through the inductance is approximately equal to the target current, the controller circuitry adjusts the current driver circuitry to the slow decay mode of operation or the fast decay mode of operation. In the slow decay mode of operation, the current driver circuitry allows the inductance to slowly discharge current. When in the slow decay mode of operation, the current driver circuitry does not supply power using currents to the inductor.

In some operations, such as a step down in the target magnitude of current, the controller circuitry adjusts the current driver circuitry for fast decay mode. In the fast decay mode of operation, the current driver circuitry sources a current in an opposite direction of the current being sourced during the drive mode of operation. Accordingly, when in fast decay mode, the current driver circuitry supplies power to the inductor. The fast decay mode of operation allows the controller circuitry to decrease current through the inductor at a rate greater than the decrease of the slow decay mode.

The current driver circuitry includes current sense circuitry to determine the current flowing through the inductance of the stepper motor. The controller circuitry determines whether to modify the mode of operation of the current driver circuitry responsive to the currents determined by the current sense circuitry. In some applications, the controller circuitry adjusts the current driver circuitry to the fast decay mode of operation to account for a decrease in the current from the target current. In such applications, the controller circuitry switches the mode of operation of the current driver circuitry to achieve the target current for a given step. The magnitudes of the target currents for any given step are determined responsive to a constant of the stepper motor, a power supply voltage of the current driver circuitry, a number of steps in the sinusoidal waveform, and a peak current to be supplied.

Changes in a mechanical load applied to the axle of the stepper motor change the amount of power needed to rotate the axle. The controller circuitry may account for relatively small changes in the mechanical load by increasing durations of time that the current driver circuitry supplies power to the inductor. For example, the controller circuitry increases durations of time in drive mode of operation. However, the controller circuitry may not account for relatively large changes in the mechanical load responsive to needing drive times that are greater than a duration of each step. In such examples, the stepper motor may stall responsive to the inability to supply enough power to induce a magnetic field capable of causing motion. Stall conditions also decrease the accuracy of positioning information responsive to an inability to position the motor for any given step. In implementations, such as medical and low rotational speed applications, where positioning of the stepper motor is crucial, changes in mechanical load may substantively affect operations of the device.

Examples described herein include methods and apparatus to sense changes in a load of a stepper motor responsive to a duty cycle of power transfer to a stepper motor for any given step. In some described examples, driver circuitry includes current driver circuitry and controller circuitry. The current driver circuitry supplies electrical power to inductances of the stepper motor. The controller circuitry controls a mode of operation of the current driver circuitry to cause a target current through the inductances of the motor. The current driver circuitry provides the controller circuitry with values that represent a current being supplied to the inductance by current sense circuitry. The controller circuitry determines an indexer coefficient using a total number of steps in a quarter cycle of the Sine wave and a current step. The controller circuitry determines the target current using the indexer coefficient and a peak current.

The controller circuitry includes duty cycle monitor circuitry to sense changes in a mechanical load of the stepper motor using a supply of power to the current driver circuitry. The duty cycle monitor circuitry determines a duty cycle of power transferred to a given inductance. The duty cycle is a duration of time where the controller circuitry sets the current driver circuitry to one of the drive mode or the fast decay mode in relation to a total time of the step. In some examples, the duty cycle monitor circuitry determines a duty cycle for one or more steps. The duty cycle monitor circuitry compares the duty cycle to previous duty cycles for similar operating conditions. For example, the duty cycle monitor circuitry compares the duty cycle of a current one or more steps of the stepper motor to at least one previous duty cycle for similar one or more steps. The duty cycle senses a change in the mechanical load applied to the stepper motor responsive to differences between the previously determined duty cycles and a current duty cycle. The step duty cycle monitor circuitry increases the peak current of the sine waveform to modify a supply of power to prevent stall and maintain accurate positioning of the axle. Advantageously, the duty cycle monitor circuitry detects variations in a mechanical load within the one or more steps of a given duty cycle. Advantageously, the controller circuitry may increase a supply of power to the stepper motor responsive to detection of variations in the mechanical load.

FIG. 1 is a block diagram of an example motor system 100 including an example stepper motor 110 and example driver circuitry 120. The stepper motor 110 is coupled to the driver circuitry 120. The stepper motor 110 converts electrical energy into mechanical energy. The driver circuitry 120 supplies electrical power to the stepper motor 110.

In the example of FIG. 1, the stepper motor 110 includes an example housing 125, a first example inductance ($L_A$) 130, a second example inductance ($L_B$) 135, an example magnet 140, and an example axle 145. The stepper motor 110 receives electrical power from the driver circuitry 120 by the inductances 130, 135. The stepper motor 110 converts the electrical power into mechanical energy by rotating the axle 145 using the magnet 140. Herein, the term inductance is used synonymously with the inductive element or inductor or conductor (e.g., coil, winding, etc.) characterized by the inductance. In some examples, the stepper motor 110 may include one or more additional inductances.

The driver circuitry 120 is coupled to the stepper motor 110. In the example of FIG. 1, the driver circuitry 120 includes first example current driver circuitry 150, example controller circuitry 155, second example current driver circuitry 160, and example duty cycle monitor circuitry 165. The driver circuitry 120 supplies a first current ($I_A$) and a second current ($I_B$) to the stepper motor 110.

The housing 125 encloses the inductances 130, 135, the magnet 140, and a portion of the axle 145. The housing 125 is mechanically coupled to the inductances 130, 135. The housing 125 includes an opening for the axle 145.

The inductances 130, 135 are electrically coupled to the driver circuitry 120. In an operation, the inductances 130, 135 are magnetically coupled to the magnet 140. The inductances 130, 135 generate magnetic fields responsive to a current from the driver circuitry 120. The magnetic fields are adjustable by magnitudes of the current supplied by the driver circuitry 120 and a direction of the current. For example, the first inductance 130 generates a magnetic field of a first magnitude responsive to a current of a first magnitude from the driver circuitry 120. In such an example, the first inductance 130 generates a magnetic field of a second magnitude responsive to a current of a second magnitude from the driver circuitry 120. Advantageously, the driver circuitry 120 controls the magnetic fields of the inductances 130, 135.

The magnet 140 is coupled to the axle 145. The magnet 140 is rotatable around the axle 145. The magnet 140 has a north pole and a south pole (illustrated in FIG. 2). The inductances 130, 135 may attract and/or repel poles of the magnet 140. In an example operation, magnetic fields of the inductances 130, 135 cause a rotation of the magnet 140 and the axle 145 by attracting and repelling the poles of the magnet 140. The axle 145 may be coupled to an external system (not illustrated). For example, the axle 145 may be coupled to a wheel to accelerate a vehicle.

The first current driver circuitry 150 is coupled to the first inductance 130 and the controller circuitry 155. The first current driver circuitry 150 supplies the first current to the first inductance 130. The controller circuitry 155 controls the first current driver circuitry 150. The first current driver circuitry 150 may be adjusted to one of a drive mode of operation, a slow decay mode of operation, or a fast decay mode of operation. When in the drive mode of operation, the first current driver circuitry 150 supplies power to the first inductance 130 by increasing the first current. When in the slow decay mode of operation, the first current driver circuitry 150 allows the first inductance 130 to discharge the magnetic field induced, which was by the first current. When in the fast decay mode of operation, the first current driver circuitry 150 supplies power to the first inductance 130 by driving the first current in a direction opposite of the current of the drive mode of operation. An example of the first current driver circuitry 150 is illustrated and described in further detail in FIG. 3, below.

The controller circuitry 155 is coupled to the current driver circuitry 150 and 160. In the example of FIG. 1, the controller circuitry 155 includes the duty cycle monitor circuitry 165. The controller circuitry 155 receives current measurements from the current driver circuitry 150, 160. The controller circuitry 155 determines the first and second currents being supplied to the stepper motor 110 responsive to the current measurements from the current driver circuitry 150, 160. The controller circuitry 155 determines an indexer coefficient ($K_n$) using a number identifying a step (n) and a total number of steps in a portion of a Sine wave (M), such as a quadrant, half cycle, etc.

The controller circuitry 155 determines target currents ($I_n$) for the first and second currents at a step responsive to a peak current ($I_{PEAK}$) and the indexer coefficient. The controller circuitry 155 determines a mode of operation of the current driver circuitry 150, 160 by comparing the target currents to the determined first and second currents. In example operation, the controller circuitry 155 modifies the mode of operation of the current driver circuitry 150 and 160 to cause the determined first and second currents to be approximately equal to the target currents. An example of the controller circuitry 155 is illustrated and described in further detail in connection with FIG. 6, below.

The duty cycle monitor circuitry 165 determines a duty cycle of a supply of power to the stepper motor 110. The duty cycle monitor circuitry 165 determines a drive duration ($\Sigma T_{on}$), a fast decay duration ($\Sigma T_{fd}$), and a total duration ($\Sigma T_{step}$). The drive duration is an interval of the total duration where the controller circuitry 155 adjusts the first current driver circuitry 150 for the drive mode of operation. The fast decay duration is an interval of the total duration where the controller circuitry 155 adjusts the first current driver circuitry 150 for the fast decay mode of operation. The total duration is a total interval of one or more steps including the drive duration, the fast decay duration, and a slow decay duration. The slow decay duration is an interval of the total duration where the controller circuitry 155 adjusts the first current driver circuitry 150 for the slow decay mode of operation. In some examples, the total duration is approximately equal to an interval of a single step. In other examples, the total duration is a multiple of the interval of a single step. The duty cycle monitor circuitry 165 determines the duty cycle to be approximately equal to the difference between the drive duration and the fast decay duration divided by the total duration. Advantageously, the duty cycle represents the duration of each step that the first current driver circuitry 150 supplies power to the first inductance 130.

The duty cycle monitor circuitry 165 determines the duty cycle for each step and/or plurality of steps of operation. The duty cycle monitor circuitry 165 compares the determined duty cycle to previous duty cycles for similar operations. For example, the duty cycle monitor circuitry 165 may determine previous duty cycles to be similar to the determined duty cycle responsive to similar magnitudes of the target current(s). In such examples, the duty cycle monitor circuitry 165 may compare the determined duty cycle to previous duty cycles for step(s) with approximately the same magnitude of the target current. In some examples, the duty cycle monitor circuitry 165 uses a moving average of the comparable previous duty cycles. In such examples, the duty cycle monitor circuitry 165 averages the determined duty cycle with the previous average of comparable previous duty cycles to update the average duty cycle.

The duty cycle monitor circuitry 165 determines changes in mechanical load applied to the stepper motor 110 responsive to differences between the determined duty cycle and the comparable previous duty cycles. When the determined duty cycle is less than the comparable previous duty cycles, the duty cycle monitor circuitry 165 determines the mechanical load of the stepper motor 110 has decreased. In such examples, decreases in the duty cycle are responsive to decreases in the load applied to the stepper motor 110. When the determined duty cycle is greater than the comparable previous duty cycles, the duty cycle monitor circuitry 165 determines the mechanical load of the stepper motor 110 has increased. In such examples, increases in the duty cycle are responsive to increases in the load applied to the stepper motor 110. An example of the duty cycle monitor circuitry 165 is illustrated and described further in connection with FIG. 6, below.

The second current driver circuitry 160 is coupled to the second inductance 135 and the controller circuitry 155. The second current driver circuitry 160 supplies the second current to the second inductance 135. The controller circuitry 155 controls the second current driver circuitry 160. The second current driver circuitry 160 may be adjusted to one of a drive mode of operation, a slow decay mode of operation, or a fast decay mode of operation. The drive mode of operation corresponds to adjusting the second current driver circuitry 160 to increase the second current (I$_B$). The slow decay mode of operation corresponds to adjusting the second current driver circuitry 160 to allow the second inductance 135 to discharge the second current (I$_B$). The fast decay mode of operation corresponds to adjusting the second current driver circuitry 160 to decrease the second current (I$_B$).

Figure 2:
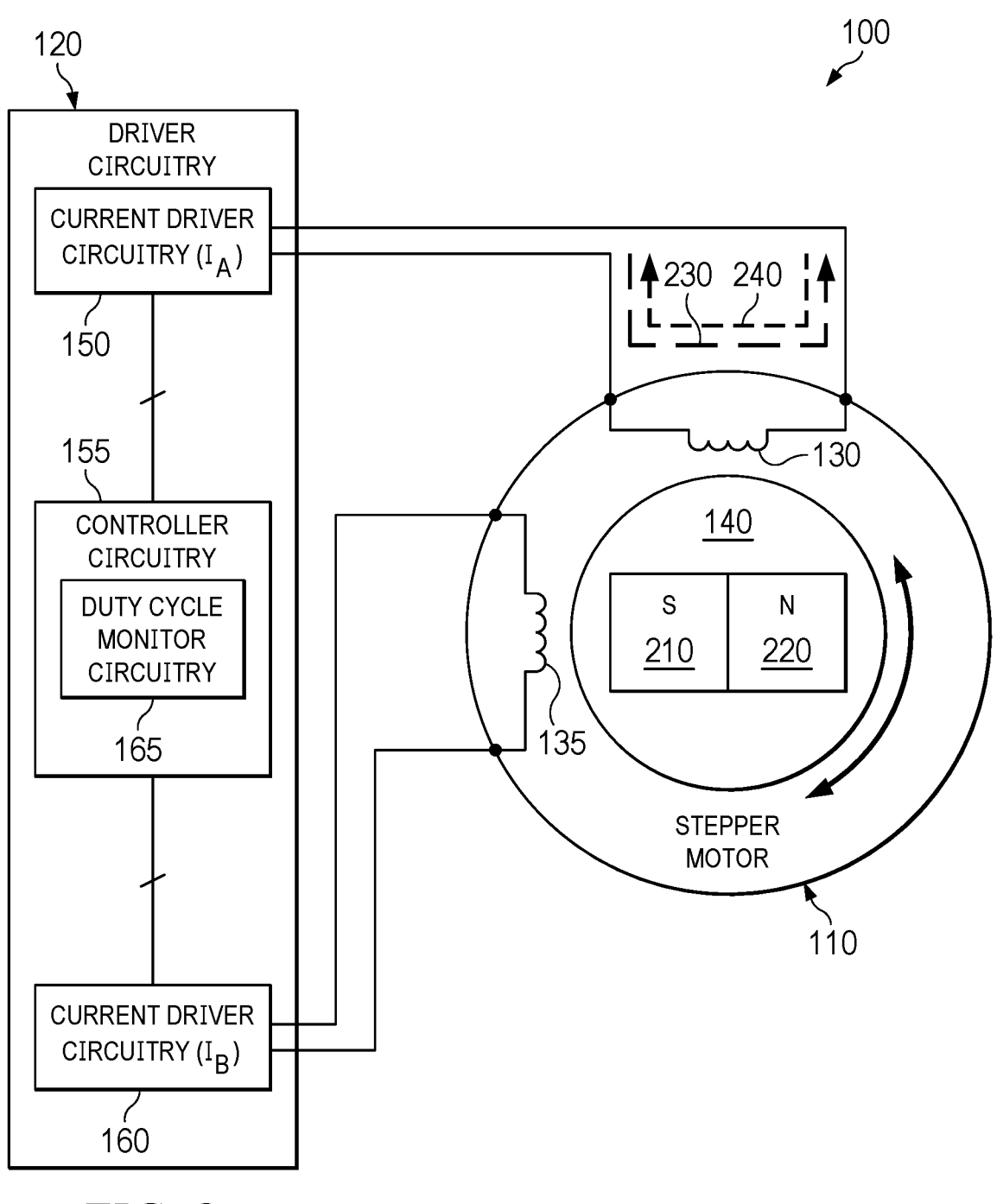
FIG. 2 is a block diagram of the example motor system of FIG. 1.

FIG. 2 is a block diagram of the example motor system 100 of FIG. 1. In the example of FIG. 2, the magnet 140 of FIG. 1 has an example south pole 210 and an example north pole 220. In an example operation, the driver circuitry 120 of FIG. 1 rotates the stepper motor 110 of FIG. 1 by supplying electrical power to the inductances 130, 135 of FIG. 1. The inductances 130, 135 generate magnetic fields that repel and attract the poles 210, 220.

In an example operation, the first inductance 130 generates a first magnetic field that attracts the north pole 220 and repels the south pole 210 when the driver circuitry 120 supplies a current flowing in a first example direction 230. In such an example operation, the first inductance 130 generates a second magnetic field that repels the north pole 220 and attracts the south pole 210 when the driver circuitry 120 supplies a current flowing in a second example direction 240. The driver circuitry 120 modifies a strength of the magnetic attraction and repulsion of the poles 210, 220 by modifying a magnitude of the first and second currents from the current driver circuitry 150, 160 of FIG. 1.

In an example operation, the driver circuitry 120 supplies the first and second currents as out of phase sinusoidal signals with a peak current (I$_{peak}$) as the amplitude. Examples of the first and second currents are illustrated and described in FIG. 4, below. In such example operations, the first and second currents rotate the magnet 140 by attracting and repelling the poles 210, 220. However, power loss by generating a back EMF is responsive to the rotation of the poles 210, 220. In some examples, the back EMF is a sinusoidal waveform resembling the sinusoidal signals of the current being supplied, such as a phase shifted sinusoidal waveform. The phase difference between the first current and the back EMF is referred to as a load angle. The load angle characterizes the magnitude of the back EMF. An example of the back EMF generated by a rotation of the magnet 140 is illustrated and described in FIG. 4, below.

In an example operation, the back EMF is greatest when the stepper motor 110 rotates with minimal mechanical load. Such an operation of the stepper motor 110 is referred to as a no-load condition. In such a condition, the poles 210, 220 freely rotate through the magnetic fields of the inductances 130, 135. In such example operations, the load angle is approximately 90°. In another example operation, the back EMF is lowest when the stepper motor 110 does not rotate due to a mechanical load that cannot be moved. Such an operation of the stepper motor 110 is referred to as a stall condition. In such a condition, the poles 210, 220 are unable to rotate through the magnetic fields of the inductances 130, 135. In such example operations, the load angle is approximately 0°.

Figure 3:
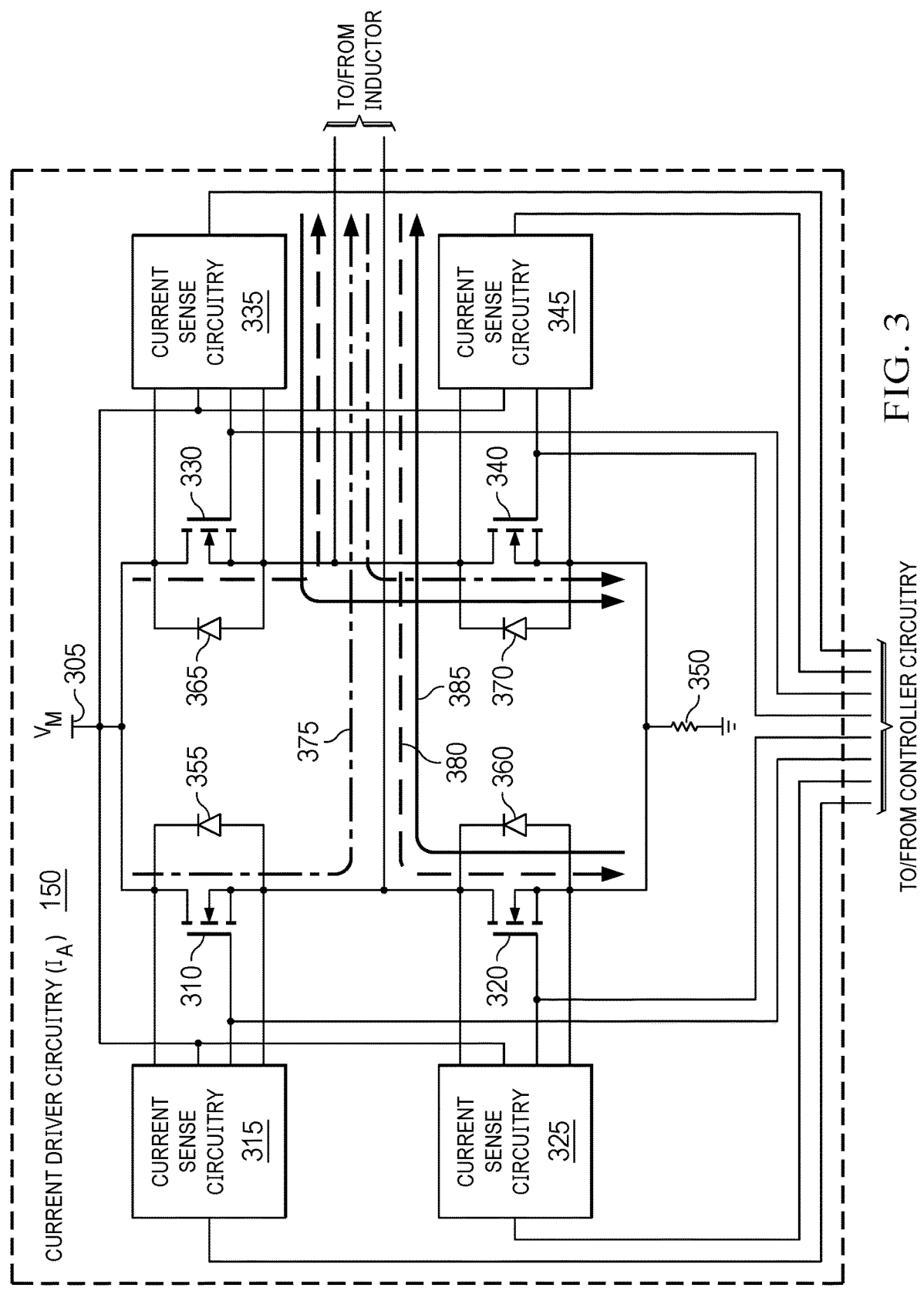
FIG. 3 is a schematic diagram of an example of the current driver circuitry of FIGS. 1 and 2.

FIG. 3 is a schematic diagram of an example of the current driver circuitry 150, 160 of FIGS. 1 and 2. In the example of FIG. 3, the first current driver circuitry 150 includes a reference voltage terminal 305 that receives a reference voltage (V$_M$), a first example transistor 310, first example current sense circuitry 315, a second example transistor 320, second example current sense circuitry 325, a third example transistor 330, third example current sense circuitry 335, a fourth example transistor 340, fourth example current sense circuitry 345, and an example resistor 350. The reference voltage V$_M$ may be provided by a voltage supply (not shown) of the system. In the example of FIG. 3, the first current driver circuitry 150 may be referred to as the current driver circuitry 150. The current driver circuitry 150 is that may be coupled to the controller circuitry 155 of FIG. 1. The current driver circuitry 150 generates a current (I$_A$).

The first transistor 310 has a drain terminal (a drain), a source terminal (a source), and a gate terminal (a gate). The drain terminal of the first transistor 310 is coupled to the reference voltage terminal 305 and the first current sense circuitry 315. The source terminal of the first transistor 310 is coupled to the first current sense circuitry 315, the second transistor 320, and that may be coupled to the first inductance 130 of FIGS. 1 and 2. The gate terminal of the first transistor 310 is coupled to the first current sense circuitry 315 and that may be coupled to the controller circuitry 155. The first transistor 310 has a first example body diode 355. The first body diode 355 is coupled to the drain and source terminals of the first transistor 310. The first body diode 355 is a characteristic of the first transistor 310. In some examples, the first body diode 355 may not be illustrated.

The first current sense circuitry 315 has a first input coupled to the reference voltage terminal 305. The first current sense circuitry 315 has a second input coupled to the drain terminal of the first transistor 310. The first current sense circuitry 315 has a third input coupled to the source terminal of the first transistor 310. The first current sense circuitry 315 has a fourth input coupled to the gate terminal of the first transistor 310. The first current sense circuitry 315 has an output that may be coupled to the controller circuitry 155. The first current sense circuitry 315 determines a first current value representative of a magnitude of current flowing through the first transistor 310. The first current sense circuitry 315 supplies the first current value at the output of the first current sense circuitry 315. In some examples, the current sense circuitry 315, 325, 335, 345 are implemented using a current sense resistor, a current sense integrated circuit, a Hall Effect sensor, or any other suitable circuitry that can measure current.

In an example operation, the controller circuitry 155 controls the first transistor 310 by controlling a gate voltage at the gate terminal of the first transistor 310. The controller circuitry 155 turns on (e.g., conducting) and turns off (e.g., non-conducting) the first transistor 310 by the gate terminal of the first transistor 310. In such an example operation, the first current sense circuitry 315 determines the first current value responsive to (and/or representative of) an amount of current flowing through the first transistor 310. The first current sense circuitry 315 supplies the first current value to the controller circuitry 155.

The second transistor 320 has a drain terminal, a source terminal, and a gate terminal. The drain terminal of the second transistor 320 is coupled to the first transistor 310, the second current sense circuitry 325, and that may be coupled to the first inductance 130. The source terminal of the second transistor 320 is coupled to the resistor 350. The gate terminal of the second transistor 320 is coupled to the second current sense circuitry 325 and that may be coupled to the controller circuitry 155. The second transistor 320 has a second example body diode 360. The second body diode 360 is coupled to the drain and source terminals of the second transistor 320. The second body diode 360 is a characteristic of the second transistor 320. In some examples, the second body diode 360 may not be illustrated.

The second current sense circuitry 325 has a first input coupled to the reference voltage terminal 305. The second current sense circuitry 325 has a second input coupled to the drain terminal of the second transistor 320. The second current sense circuitry 325 has a third input coupled to the source terminal of the second transistor 320. The second current sense circuitry 335 has a fourth input coupled to the gate terminal of the second transistor 320. The second current sense circuitry 325 has an output that may be coupled to the controller circuitry 155. The second current sense circuitry 325 determines a second current value representative of a magnitude of current flowing through the second transistor 320. The second current sense circuitry 325 supplies the second current value at the output of the second current sense circuitry 325.

In an example operation, the controller circuitry 155 controls the second transistor 320 by controlling a gate voltage at the gate terminal of the second transistor 320. The controller circuitry 155 turns on (e.g., conducting) and turns off (e.g., non-conducting) the second transistor 320 by the gate terminal of the second transistor 320. In such an example operation, the second current sense circuitry 325 determines the second current value responsive to (and/or representative of) an amount of current flowing through the second transistor 320. The second current sense circuitry 325 supplies the second current value to the controller circuitry 155.

The third transistor 330 has a drain terminal, a source terminal, and a gate terminal. The drain terminal of the third transistor 330 is coupled to the reference voltage terminal 305 and the third current sense circuitry 335. The source terminal of the third transistor 330 is coupled to the third current sense circuitry 335, the fourth transistor 340, and that may be coupled to the first inductance 130. The gate terminal of the third transistor 330 is coupled to the third current sense circuitry 335 and that may be coupled to the controller circuitry 155. The third transistor 330 has a third example body diode 365. The third body diode 365 is coupled to the drain and source terminals of the third transistor 330. The third body diode 365 is a characteristic of the third transistor 330. In some examples, the third body diode 365 may not be illustrated.

The third current sense circuitry 335 has a first input coupled to the reference voltage terminal 305, which supplies the reference voltage. The third current sense circuitry 335 has a second input coupled to the drain terminal of the third transistor 330. The third current sense circuitry 335 has a third input coupled to the source terminal of the third transistor 330. The third current sense circuitry 335 has a fourth input coupled to the gate terminal of the third transistor 330. The third current sense circuitry 335 has an output that may be coupled to the controller circuitry 155. The third current sense circuitry 335 determines a third current value representative of a magnitude of current flowing through the third transistor 330. The third current sense circuitry 335 supplies the third current value at the output of the third current sense circuitry 335.

In an example operation, the controller circuitry 155 controls the third transistor 330 by controlling a gate voltage at the gate terminal of the third transistor 330. The controller circuitry 155 turns on (e.g., conducting) and turns off (e.g., non-conducting) the third transistor 330 by the gate terminal of the third transistor 330. In such an example operation, the third current sense circuitry 335 determines the third current value using (and/or representative of) an amount of current flowing through the third transistor 330. The third current sense circuitry 335 supplies the third current value to the controller circuitry 155.

The fourth transistor 340 has a drain terminal, a source terminal, and a gate terminal. The drain terminal of the fourth transistor 340 is coupled to the third transistor 330, the fourth current sense circuitry 345, and that may be coupled to the first inductance 130. The source terminal of the fourth transistor 340 is coupled to the resistor 350. The gate terminal of the fourth transistor 340 is coupled to the fourth current sense circuitry 345 and that may be coupled to the controller circuitry 155. The fourth transistor 340 has a fourth example body diode 370. The fourth body diode 370 is coupled to the drain and source terminals of the fourth transistor 340. The fourth body diode 370 is a characteristic of the fourth transistor 340. In some examples, the fourth body diode 370 may not be illustrated.

In the example of FIG. 3, the transistors 310, 320, 330, 340 are n-channel metal-oxide semiconductor field-effect transistors (MOSFETs). Alternatively, the transistors 310, 320, 330, 340 may be n-channel field-effect transistor (FET), an n-channel insulated-gate bipolar transistor (IGBT), an n-channel junction field effect transistor (JFET), an NPN bipolar junction transistor (BJT) and/or, with slight modifications, a p-type equivalent device. The transistors 310, 320, 330, 340 may be depletion mode devices, drain-extended devices, enhancement mode devices, natural transistors or other type of device structure transistors. Furthermore, the transistors 310, 320, 330, 340 may be implemented in/over a silicon substrate (Si), a silicon carbide substrate (SiC), a gallium nitride substrate (GaN) or a gallium arsenide substrate (GaAs).

The fourth current sense circuitry 345 has a first input coupled to the reference voltage terminal 305. The fourth current sense circuitry 345 has a second input coupled to the drain terminal of the fourth transistor 340. The fourth current sense circuitry 345 has a third input coupled to the source terminal of the fourth transistor 340. The second current sense circuitry 335 has a fourth input coupled to the gate terminal of the fourth transistor 340. The fourth current sense circuitry 345 has an output that may be coupled to the controller circuitry 155. The fourth current sense circuitry 345 determines a fourth current value representative of a magnitude of current flowing through the fourth transistor 340. The fourth current sense circuitry 345 supplies the fourth current value at the output of the fourth current sense circuitry 345.

In an example operation, the controller circuitry 155 controls the fourth transistor 340 by controlling a gate voltage at the gate terminal of the fourth transistor 340. The controller circuitry 155 turns on (e.g., conducting) and turns off (e.g., non-conducting) the fourth transistor 340 by the gate terminal of the fourth transistor 340. In such an example operation, the fourth current sense circuitry 345 determines the fourth current value using (and/or representative of) an amount of current flowing through the fourth transistor 340. The fourth current sense circuitry 345 supplies the fourth current value to the controller circuitry 155.

The resistor 350 has a first terminal coupled to the transistors 320 and 340. The resistor 350 has a second terminal coupled to a common terminal that provides a common potential (e.g., ground). In some examples, the resistor 350 is referred to as a pull-down resistor. In such examples, the resistor 350 provides a current path to the common potential.

In example operations, the controller circuitry 155 may adjust the current driver circuitry 150 to one of a drive mode of operation, a fast decay mode of operation, and a slow decay mode of operation. In the drive mode of operation, the current driver circuitry 150 supplies the first current to the first inductance 130 using a first example current path 375. The first current path 375 allows current to flow from the reference voltage terminal 305 through the first transistor 310, the first inductance 130, the fourth transistor 340, and the resistor 350. When the current driver circuitry 150 is in the drive mode of operation, the transistors 310, 340 are turned on and the transistors 320, 330 are turned off. When in the drive mode of operation, the current driver circuitry 150 supplies power using currents to the first inductance 130.

In the fast decay mode of operation, the current driver circuitry 150 supplies the first current to the first inductance 130 using a second example current path 380. The second current path 380 allows current to flow from the reference voltage terminal 305 through the third transistor 330, the first inductance 130, the second transistor 320, and the resistor 350. When the current driver circuitry 150 is in the fast decay mode of operation, the transistors 320, 330 are turned on and the transistors 310, 340 are turned off. When in the fast decay mode of operation, the current driver circuitry 150 supplies power using currents to the first inductance 130.

In the slow decay mode of operation, the current driver circuitry 150 discharges the first current using a third example current path 385. The third current path 385 allows current to flow through the second transistor 320, the first inductance 130, and the fourth transistor 340. When the current driver circuitry 150 is in the slow decay mode of operation, the transistors 320, 340 are turned on and the transistors 310, 330 are turned off. When in the slow decay mode of operation, the current driver circuitry 150 fails to supply power using currents to the first inductance 130.

In an example operation, the controller circuitry 155 modifies the mode of operation of the current driver circuitry 150 to supply the first current approximately equal to a target current. An example sequencing of modes of operation of the current driver circuitry 150 is illustrated and described in FIG. 5, below.

Figure 4:
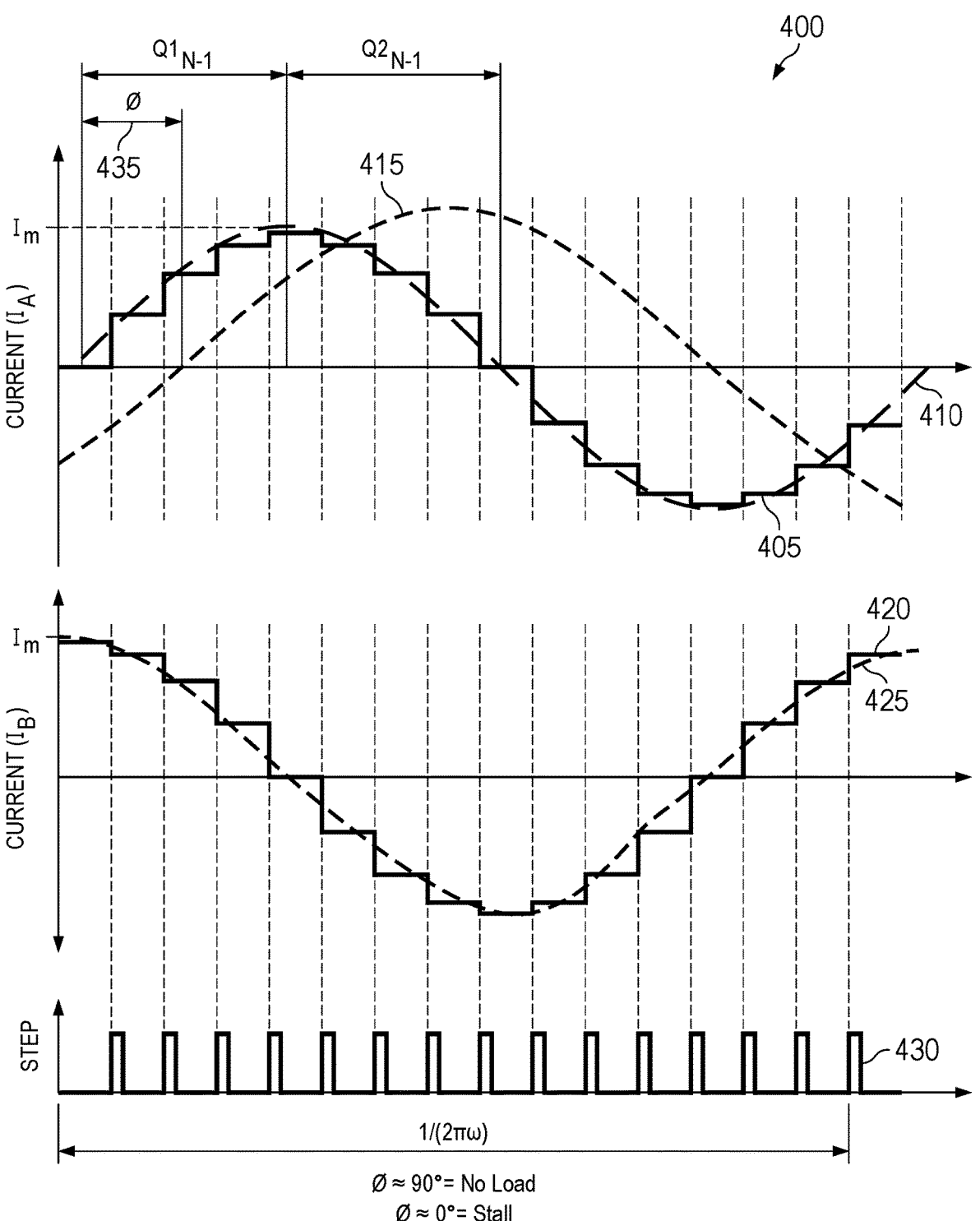
FIG. 4 is a timing diagram of an example operation of the driver circuitry of FIGS. 1 and 2.

FIG. 4 is a timing diagram 400 of an example operation of the driver circuitry 120 of FIGS. 1 and 2. In the example of FIG. 4, the timing diagram 400 illustrates first example current steps 405, a first example current 410, an example back EMF 415, second example current steps 420, a second example current 425, and example step pulse train 430 (shown as a series or sequence of pulses). The driver circuitry 120 supplies the current steps 405, 420 to the inductances 130, 135 of FIGS. 1 and 2. The magnet 140 of FIGS. 1 and 2 rotates the axle 145 of FIG. 1 responsive to the current steps 405, 420.

The first current steps 405 are an approximate representation of a current from the first current driver circuitry 150 of FIGS. 1, 2, and 3. The first current steps 405 represent a continuous time sinusoidal waveform using discrete time. The first current steps 405 have a plurality of steps that approximate a sinusoidal waveform represented by the first current 410. The first current driver circuitry 150 generates the first current steps 405 as an approximate representation of sinusoidal waveform of the first current 410. Accordingly, the magnitudes of the first current steps 405 are the target currents for each step. The first current 410 has a frequency approximately equal to one divided by 2 times pi ($\pi$) omega ($\omega$). The first current 410 represents an ideal first current from the first current driver circuitry 150.

The back EMF 415 represents the power the stepper motor 110 of FIGS. 1 and 2 converts to mechanical energy. A phase difference between the first current 410 and the back EMF 415 is an example load angle 435. A no load condition of the stepper motor 110 corresponds to the load angle 435 being approximately equal to 90°. A stall condition of the stepper motor 110 corresponds to the load angle being approximately equal to 0°.

The second current steps 420 are an approximate representation of a current from the second current driver circuitry 160 of FIGS. 1 and 2. The second current steps 420 represent a continuous time sinusoidal waveform using discrete time. The second current steps 420 have a plurality of steps that approximate a sinusoidal waveform represented by the second current 425. The second current driver circuitry 160 generates the second current steps 420 as an approximate representation of sinusoidal waveform of the second current 425. The second current 425 has a frequency approximately equal to one divided by 2 times pi ($\pi$) omega ($\omega$). The second current 425 represents an ideal second current from the second current driver circuitry 160.

In the example of FIG. 4, the currents 410, 425 are out of phase. The phase difference between the currents 410, 425 is responsive to and/or representative of the orientation of the inductances 130, 135. The phase difference allows the poles 210, 220 of FIG. 2 to transition from a first magnetic field of a first one of the inductances 130, 135 to a second magnetic field of a second one of the inductances 130, 135.

The step pulse train 430 represents timing of transitions between steps of the current steps 405, 420. The frequency of pulses of the step pulse train 430 determines the speed of rotation of the stepper motor 110. In some examples, the controller circuitry 155 may increase the speed of the stepper motor 110 by decreasing a time between pulses of the step pulse train 430. In such examples, the controller circuitry 155 increases the frequency of pulses of the step pulse train 430. The controller circuitry 155 generates the step pulse train 430 to increment the current steps 405, 420 to increase and/or decrease a step number to a subsequent step.

Figure 5:
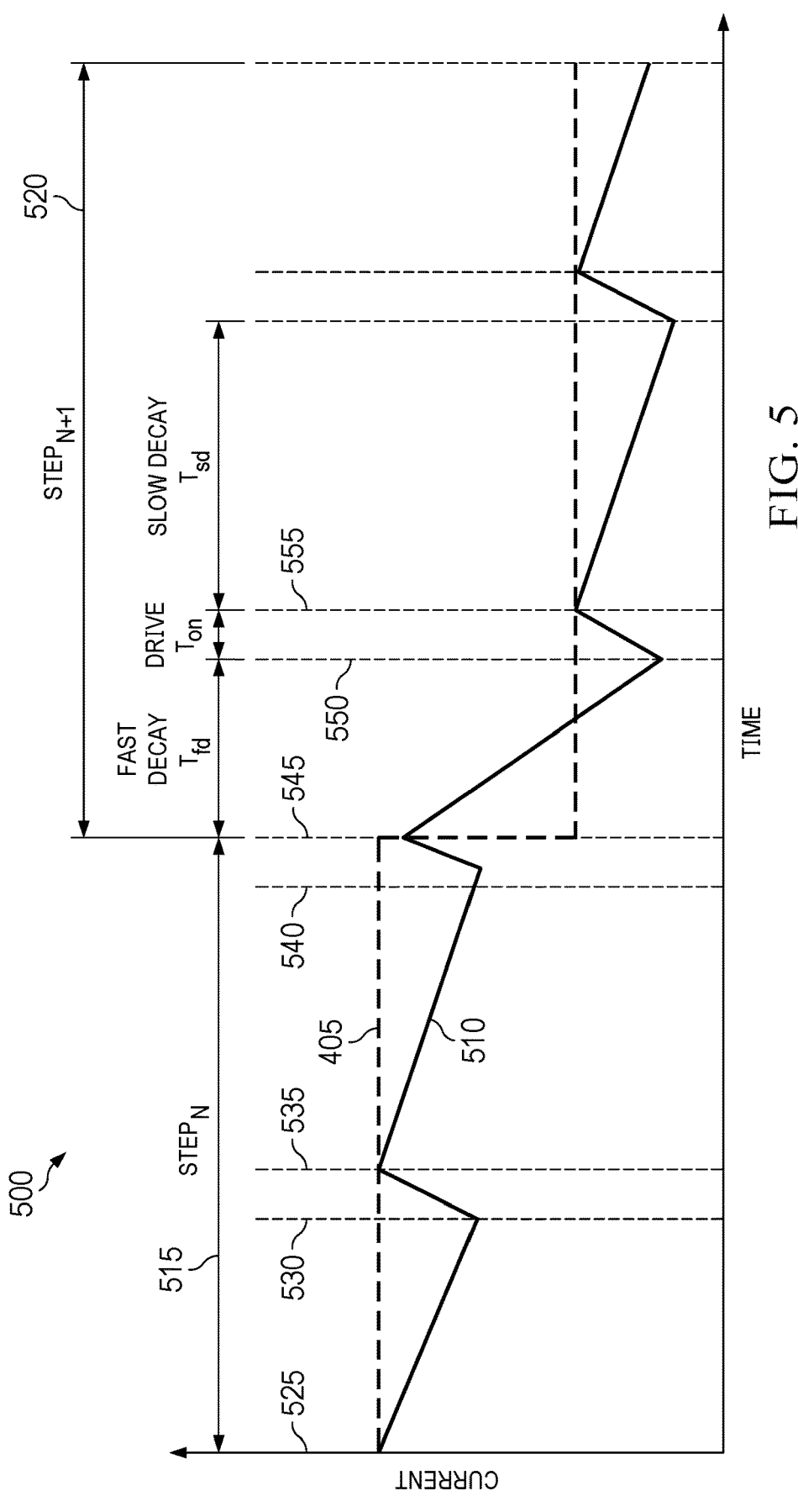
FIG. 5 is a timing diagram of an example operation of the driver circuitry of FIGS. 1 and 2.

FIG. 5 is a timing diagram 500 of an example operation of the driver circuitry 120 of FIGS. 1 and 2. In the example of FIG. 5, the timing diagram 500 includes an example portion of the first current steps 405 of FIG. 4 and an example driver output current 510. The portion of the first current step 405 illustrated in FIG. 5 includes a first example step (STEP$_N$) 515 and a second example step (STEP$_{N+1}$) 520.

The driver output current 510 represents a current at the output of the first current driver circuitry 150 of FIGS. 1, 2, and 3. During the first step 515, the controller circuitry 155 of FIGS. 1 and 2 determines the mode of operation of the first current driver circuitry 150 responsive to a first magnitude of the first current steps 405 for the first step 515. In some examples, the first step 515 is identifiable by an indexer value. In such examples, the indexer value identifies which step of the first current steps 405 corresponds to the first step 515. In such examples, the indexer value may determine a target current for the first step 515. During the second step 520, the controller circuitry 155 determines the mode of operation of the first current driver circuitry 150 responsive to a second magnitude of the first current steps 405 at the second step 520. In some examples, a transition between the steps 515, 520 occurs by adjusting the indexer value to identify the second step 520. In such examples, the controller circuitry 155 may adjust the indexer value responsive to a pulse of the step pulse train 430.

At a first time 525, the controller circuitry 155 adjusts the first current driver circuitry 150 to the slow decay mode of operation responsive to the driver output current 510 being approximately equal to the target current of first current steps 405 for the first step 515. In some examples, the slow decay mode of operation corresponds to the third current path 385 of FIG. 3. In the slow decay mode of operation, the driver output current 510 decreases relatively slowly.

At a second time 530, the controller circuitry 155 determines that the driver output current 510 has decreased by a threshold value. At the second time 530, the controller circuitry 155 adjusts the first current driver circuitry 150 to the drive mode of operation. In some examples, the drive mode of operation corresponds to the first current path 375 of FIG. 3. In the drive mode of operation, the driver output current 510 increases relatively quickly responsive to current being supplied by the reference terminal, which supplies the reference voltage.

At a third time 535, the controller circuitry 155 detects that the driver output current 510 is approximately equal to the target current for the first step 515 of the first current steps 405. At the third time 535, the controller circuitry 155 adjusts the first current driver circuitry 150 to the slow decay mode of operation. Following the third time 535, the driver output current 510 decreases relatively slowly.

At a fourth time 540, the controller circuitry 155 detects that the driver output current 510 has decreased by the threshold amount. At the fourth time 540, the controller circuitry 155 adjusts the first current driver circuitry 150 to the drive mode of operation. In the drive mode of operation, the driver output current 510 increases relatively quickly as power is supplied to the system.

At a fifth time 545, the controller circuitry 155 detects the transition from the first step 515 to the second step 520. In some examples, the controller circuitry 155 detects the transition responsive to a pulse of the step pulse train 430. At the fifth time 545, the controller circuitry 155 adjusts the first current driver circuitry 150 to the fast decay mode of operation. In some examples, the fast decay mode of operation corresponds to the second current path 380 of FIG. 3. In the fast decay mode of operation, the driver output current 510 decreases relatively quickly. Advantageously, the fast decay mode of operation enables the first current driver circuitry 150 to decrease the driver output current 510 relatively faster than the slow decay mode of operation. In some example operations, such as when the amplitudes of the first current steps 405 are negative, the controller circuitry 155 uses the fast decay mode to achieve the target currents of the first current steps 405. In such example operations, the controller circuitry 155 may use the drive mode of operation to transition the driver output current 510 between steps.

At a sixth time 550, the controller circuitry 155 detects that the driver output current 510 is approximately equal to the target current of the first current steps 405 for the second step 520 minus the threshold value. At the sixth time 550, the controller circuitry 155 adjusts the first current driver circuitry 150 to the drive mode of operation. In the drive mode of operation, the driver output current 510 increases relatively quickly.

At a seventh time 555, the controller circuitry 155 detects that the driver output current 510 is approximately equal to the first current steps 405 during the second step 520. At the seventh time 555, the controller circuitry 155 adjusts the first current driver circuitry 150 to the slow decay mode of operation. Following the seventh time 555, the driver output current 510 decreases relatively slowly. Advantageously, the controller circuitry 155 may use the different modes of operation of the current driver circuitry 150, 160 of FIGS. 1, 2, and 3 to generate the current steps 405, 420 of FIG. 4.

Figure 6:
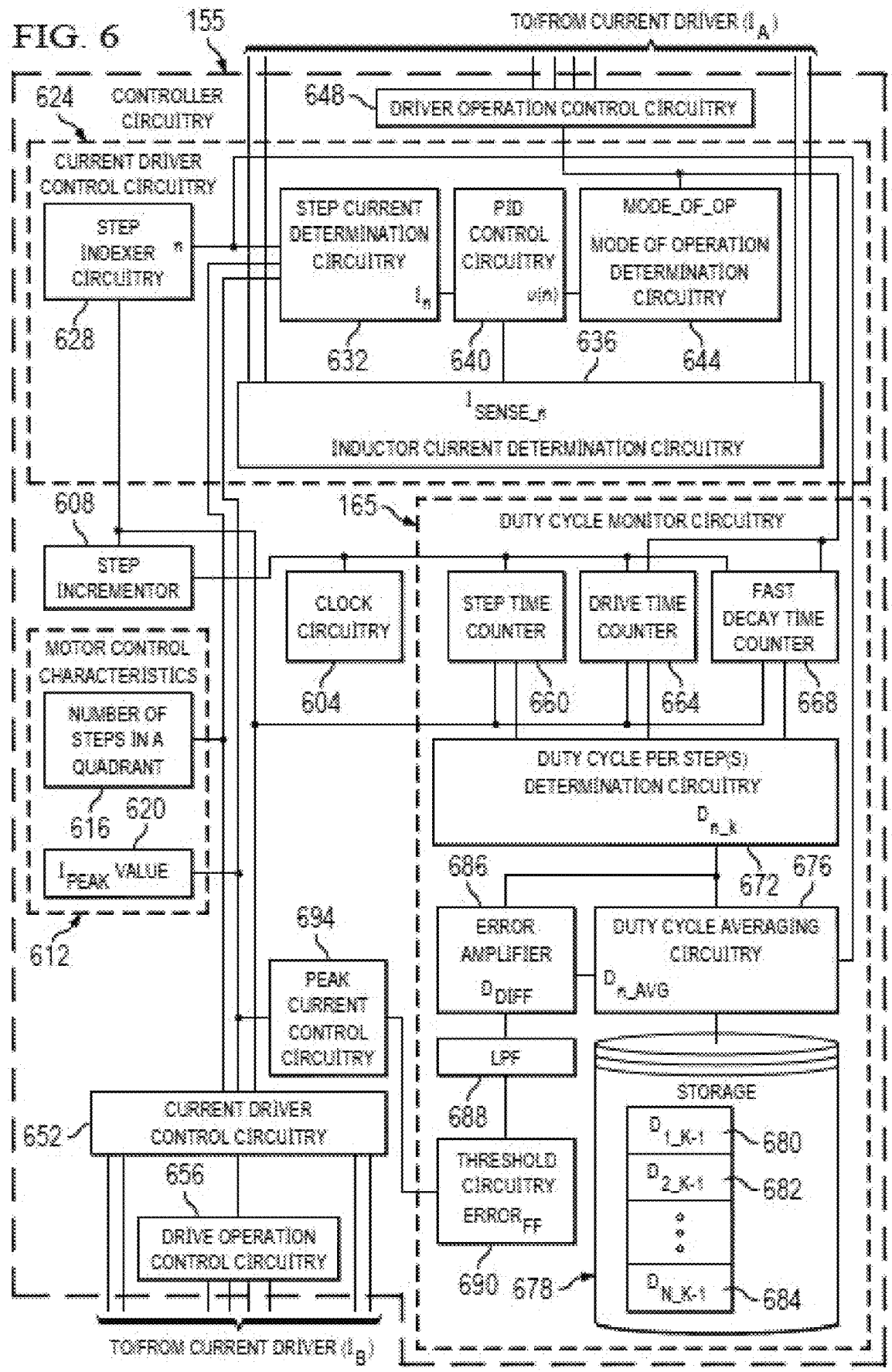
FIG. 6 is a block diagram of an example of the controller circuitry of FIGS. 1 and 2 in which example step duty monitor circuitry operates to detect changes in a load of the stepper motor of FIGS. 1 and 2.

FIG. 6 is a block diagram of an example implementation of the controller circuitry 155 of FIGS. 1 and 2 to changes in the load of the stepper motor 110 of FIGS. 1 and 2. The controller circuitry 155 of FIG. 6 may be instantiated (e.g., creating an instance of, bring into being for any length of time, materialize, implement, etc.) by programmable circuitry such as a Central Processor Unit (CPU) executing first instructions. Additionally or alternatively, the controller circuitry 155 of FIG. 6 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Accordingly, all of the controller circuitry 155 of FIG. 6 may be instantiated at the same or different times. Some or all of the controller circuitry 155 of FIG. 6 may be instantiated, for example, in one or more threads executing concurrently on hardware and/or in series on hardware. Moreover, in some examples, some or all of the controller circuitry 155 of FIG. 6 is implemented by microprocessor circuitry executing instructions and/or FPGA circuitry performing operations to implement one or more virtual machines and/or containers.

In the example of FIG. 6, the controller circuitry 155 includes the duty cycle monitor circuitry 165 of FIGS. 1 and 2, example clock circuitry 604, an example step incrementor 608, example motor control characteristics 612, an example number of steps in a quadrant value 616, an example peak current value 620, first example current driver control circuitry 624, example step indexer circuitry 628, example step current determination circuitry 632, example inductor current determination circuitry 636, example proportional-integral-derivative (PID) control circuitry 640, example mode of operation determination circuitry 644, first example drive operation control circuitry 648, second example current driver control circuitry 652, second example drive operation control circuitry 656, an example step time counter 660, an example drive time counter 664, an example fast decay time counter 668, example duty cycle per step determination circuitry 672, example duty cycle averaging circuitry 676, example storage 678, a first example average value 680, a second example average value 682, a third example average value 684, example error amplifier circuitry 686, an example low pass filter 688, example threshold circuitry 690, and example peak current control circuitry 694. The controller circuitry 155 controls the mode of operation of the current driver circuitry 150, 160 of FIGS. 1, 2, and 3 responsive to the drive operation control circuitry 648, 656. The duty cycle monitor circuitry 165 senses changes in the load of the stepper motor 110 of FIGS. 1 and 2.

The clock circuitry 604 is coupled to the duty cycle monitor circuitry 165 and the step incrementor 608. The clock circuitry 604 generates a reference clock. The clock circuitry 604 supplies the reference clock to the duty cycle monitor circuitry 165, the step incrementor 608, and the counters 660, 664, 668. In some examples, the controller circuitry 155 may receive the reference clock from an external clock source, such as a crystal oscillator, a resistor-capacitor oscillator, etc.

The step incrementor 608 has a first input coupled to the clock circuitry 604. The step incrementor 608 has a second input coupled to the current driver control circuitry 624, 652. The step incrementor 608 generates a step pulse train (e.g., the step pulse train 430 of FIG. 4) responsive to the reference clock from the clock circuitry 604. The step incrementor 608 supplies the step pulse train to the current driver control circuitry 624, 652. In some examples, the step incrementor 608 is instantiated by programmable circuitry executing step incrementor instructions and/or other circuitry performing operations such as those represented by the flowchart of FIGS. 9A and 9B.

The motor control characteristics 612 is coupled to the duty cycle monitor circuitry 165 and the current driver control circuitry 624, 652. In the example of FIG. 6, the motor control characteristics 612 includes the number of steps in a quadrant value 616 and the peak current value 620. In some examples, the motor control characteristics 612 may be implemented as a memory, such as one or more registers, volatile memory, non-volatile memory, etc. In other examples, the motor control characteristics 612 may receive the values 616, 620 from an external data source, such as a main memory, processor circuitry, etc.

The number of steps in a quadrant value 616 represents a number of steps (e.g., the steps 515, 520 of FIG. 5) within a quadrant of the sinusoidal waveform of the first current 410 of FIG. 4. For example, the number of steps in a quadrant value 616 is the number of steps in approximately one divided by eight times pi ($\pi$) and omega ($\omega$) of the sinusoidal waveform of the first current 410. The peak current value 620 represents an amplitude of the first current 410. Also, during an example operation, the peak current value 620 is the maximum current of the currents from the driver circuitry 120 of FIGS. 1 and 2. The motor control characteristics 612 supplies the values 616 and 620 to the current driver control circuitry 624 and 652.

The first current driver control circuitry 624 may be coupled to the current sense circuitry 315, 325, 335, 345 of FIG. 3 of the first current driver circuitry 150 of FIGS. 1, 2, and 3. The first current driver control circuitry 624 is coupled to the duty cycle monitor circuitry 165, the step incrementor 608, the motor control characteristics 612, and the first drive operation control circuitry 648. In the example of FIG. 6, the first current driver control circuitry 624 includes the step indexer circuitry 628, the step current determination circuitry 632, the inductor current determination circuitry 636, the PID control circuitry 640, and the mode of operation determination circuitry 644.

The first current driver control circuitry 624 determines a current for a given step using the step indexer circuitry 628 and the step current determination circuitry 632. The first current driver control circuitry 624 determines the first current responsive to the inductor current determination circuitry 636. The first current driver control circuitry 624 determines the mode of operation of the first current driver circuitry 150 using the mode of operation determination circuitry 644. In some examples, the first current driver control circuitry 644 is instantiated by programmable circuitry executing current driver control instructions and/or other circuitry performing operations such as those represented by the flowchart of FIGS. 9A and 9B.

The step indexer circuitry 628 has an input coupled to the step incrementor 608. The step indexer circuitry 628 has an output coupled to the duty cycle monitor circuitry 165 and the step current determination circuitry 632. The step indexer circuitry 628 generates an indexer value (n) which identifies a step the first current steps 405 of FIG. 4. The step indexer circuitry 628 adjusts the indexer value responsive to a pulse of the step pulse train 430 of the step incrementor 608. In some examples, the step indexer circuitry 628 increments the indexer value by one responsive to each pulse of the step pulse train 430. The step indexer circuitry 628 supplies the indexer value to the duty cycle monitor circuitry 165 and the step current determination circuitry 632. In some examples, the step indexer circuitry 628 is instantiated by programmable circuitry executing step tracking instructions and/or other circuitry performing operations such as those represented by the flowchart of FIGS. 9A and 9B.

The step current determination circuitry 632 has a first input coupled to the number of steps in a quadrant value 616 of the motor control characteristics 612. The step current determination circuitry 632 has a second input coupled to the peak current value 620 of the motor control characteristics 612. The step current determination circuitry 632 has a third input coupled to step indexer circuitry 628. The step current determination circuitry 632 receives the indexer value, which represents the current step (n), the number of steps in a quadrant value (M) 616, and the peak current value ($I_{PEAK}$) 620.

The step current determination circuitry 632 determines an indexer coefficient ($K_n$) for the current step of the indexer value. The indexer coefficient represents the portion of the Sine wave of the current (e.g., the currents 410, 425 of FIG. 4) corresponding to the indexer value. The step current determination circuitry 632 determines the indexer coefficient using the indexer value and the number of steps in a quadrant value (M) 616. In some examples, the step current determination circuitry 632 determines the indexer coefficient by taking the sine of ninety divided by the number of steps in a quadrant value 632 times the indexer value. In such examples, the step current determination circuitry 632 uses Equation (1), below, to determine the indexer coefficient.

$$K_n = \sin\left(\left(90^0 / M\right) * n\right); \qquad \text{Equation (1)}$$

The step current determination circuitry 632 determines a target step current ($I_n$) is proportional to the peak current value 620 and the indexer coefficient from Equation (1), above. The target step current is a target current during the current step (e.g., one of the steps of the current steps 405, 420). In some examples, the step current determination circuitry 632 determines the target step current by multiplying the peak current value 620 by the indexer coefficient. In such examples the step current determination circuitry 632 uses Equation (2), below, to determine the target step current.

$$I_n = I_{peak} * K_n \qquad \text{Equation (2)}$$

The step current determination circuitry 632 has an output coupled to the PID control circuitry 640. The step current determination circuitry 632 supplies the target step current to the PID control circuitry 640. In some examples, the step current determination circuitry 632 is instantiated by programmable circuitry executing step current determination instructions and/or other circuitry performing operations such as those represented by the flowchart of FIGS. 9A and 9B.

The inductor current determination circuitry 636 has inputs that may be coupled to the first current driver circuitry 150. The inductor current determination circuitry 636 receives current values from the current sense circuitry 315, 325, 335, 345 of FIG. 3. The inductor current determination circuitry 636 determines a sense current value ($I_{SENSE\_n}$) of the first current responsive to the current values from the first current driver circuitry 150. For example, in the drive mode of operation, the inductor current determination circuitry 636 determines the first current responsive to the current values of the current sense circuitry 315, 345. The inductor current determination circuitry 636 has an output coupled to the PID control circuitry 640. The inductor current determination circuitry 636 supplies the determined sense current value to the PID control circuitry 640. In some examples, the inductor current determination circuitry 636 is instantiated by programmable circuitry executing inductor current determination instructions and/or other circuitry performing operations such as those represented by the flowchart of FIGS. 9A and 9B.

The PID control circuitry 640 has a first input coupled to the step current determination circuitry 632 and a second input coupled to the inductor current determination circuitry 636. The PID control circuitry 640 receives the target step current and the sense current value. The PID control circuitry 640 is a control loop that utilizes an error value (e(t)) to generate a control variable (u(t)). In the example of FIG. 6, the PID control circuitry 640 determines the error value to be approximately equal to the target step current minus the sense current value. The PID control circuitry 640 combines proportional (P), integral (I), and derivative (D) elements to generate the control variable. The proportional element is approximately the error value times a proportional gain ($K_p$). The integral element is approximately the integral of the error value times an integral gain ($K_i$). The derivative element is approximately equal to the derivative of the error value timed a derivative gain ($K_d$). The proportional, integral, and derivative gains of the PID control circuitry 640 allow for the PID control circuitry 640 to adjust contributions of the proportional, integral, and derivative elements in the calculation of the control variable.

The PID control circuitry 640 has an output coupled to the mode of operation determination circuitry 644. The PID control circuitry 640 supplies the control variable to the mode of operation determination circuitry 644. In some examples, the PID control circuitry 640 is instantiated by programmable circuitry executing PID control instructions and/or other circuitry performing operations such as those represented by the flowchart of FIGS. 9A and 9B.

The mode of operation determination circuitry 644 has an input coupled to PID control circuitry 640. The mode of operation determination circuitry 644 receives the control variable. The mode of operation determination circuitry 644 selects one of the drive mode of operation, the fast decay mode of operation, or the slow decay mode of operation responsive to the control variable.

When the control variable represents a condition where the sense current value is approximately the threshold value less than the target step current, the mode of operation determination circuitry 644 selects the drive mode of operation. For example, the mode of operation determination circuitry 644 selects the drive mode of operation at the times 530, 540, 550 of FIG. 5. In some examples, the mode of operation determination circuitry 644 selects the drive mode of operation responsive to the control value being greater than a reference value. The reference value represents acceptable error values. However, differences between the target step current and the sense current value greater than the threshold value. Advantageously, the drive mode of operation the error value of the PID control circuitry 640 by increasing the sense current value.

When the control variable represents a condition where the sense current value is approximately equal to the target step current, the mode of operation determination circuitry 644 selects the slow decay mode of operation. For example, the mode of operation determination circuitry 644 selects the slow decay mode of operation at the times 525, 535, 555 of FIG. 5. In some examples, the mode of operation determination circuitry 644 may select the slow decay mode of operation when the target step current is approximately equal to the target step current.

When the control variable represents a condition where the sense current value is greater than the threshold value less than the target step current, the mode of operation determination circuitry 644 selects the fast decay mode of operation. In some examples, a rapid decrease in the target step current occurs responsive to a step increment. In such examples, the step current determination circuitry 632 adjusts the target step current and the sense current value remains unchanged by the step until the mode of operation determination circuitry 644 compensates. For example, the mode of operation determination circuitry 644 selects the fast decay mode of operation at the fifth time 545 of FIG. 5. In some examples, the PID control circuitry 640 accounts for sudden changes in the target step current responsive to the derivative element of the control variable. For example, a sudden change in the target step current has relatively large derivative compared to times where the indexer value remains fixed. Advantageously, the mode of operation determination circuitry 644 selects a mode of operation responsive to the control variable of the PID control circuitry 640.

The mode of operation determination circuitry 644 has an output coupled to the duty cycle monitor circuitry 165 and the first drive operation control circuitry 648. The mode of operation determination circuitry 644 supplies the selected mode of operation to the duty cycle monitor circuitry 165 and the first drive operation control circuitry 648. In some examples, the mode of operation determination circuitry 644 is instantiated by programmable circuitry executing mode of operation determination instructions and/or other circuitry performing operations such as those represented by the flowchart of FIGS. 9A and 9B.

The first driver operation control circuitry 648 has an input coupled to the first current driver control circuitry 624. The first driver operation control circuitry 648 has outputs that may be coupled to the first current driver circuitry 150. The first drive operation control circuitry 648 receives the selected mode of operation from the mode of operation determination circuitry 644. The first drive operation control circuitry 648 adjusts the first current driver circuitry 150 responsive to the selected mode of operation. In some examples, the first drive operation control circuitry 648 turns on and/or turns off the transistors 310, 320, 330, 340 of FIG. 3 to adjust the first current driver circuitry 150 to the selected mode of operation. In some examples, the first drive operation control circuitry 648 is instantiated by programmable circuitry executing driver operation control instructions and/or other circuitry performing operations such as those represented by the flowchart of FIGS. 9A and 9B.

The second current driver control circuitry 652 may be coupled to the second current driver circuitry 160 of FIGS. 1 and 2. The second current driver control circuitry 652 is coupled to the step incrementor 608, the motor control characteristics 612, and the second drive operation control circuitry 656. The second current driver control circuitry 652 determines a target current for a given step of the second current steps 420 of FIG. 4. The second current driver control circuitry 652 determines the second current of the second current driver circuitry 160. The second current driver control circuitry 652 determines the mode of operation of the second current driver circuitry 160. Similar to the first current driver control circuitry 624, the second current driver control circuitry 652 selects a mode of operation of the second drive operation control circuitry 656. In some examples, the second current driver control circuitry 652 is instantiated by programmable circuitry executing current driver control instructions and/or other circuitry performing operations such as those represented by the flowchart of FIGS. 9A and 9B.

The second drive operation control circuitry 656 has an input coupled to the second current driver control circuitry 652. The second drive operation control circuitry 656 has outputs that may be coupled to the second current driver circuitry 160. The second drive operation control circuitry 656 receives the selected mode of operation from the second current driver control circuitry 652. The second drive operation control circuitry 656 adjusts the second current driver circuitry 160 responsive to the selected mode of operation. In some examples, the second drive operation control circuitry 656 adjusts the second current driver circuitry 160 to the selected mode of operation. In some examples, the second drive operation control circuitry 656 is instantiated by programmable circuitry executing driver operation control instructions and/or other circuitry performing operations such as those represented by the flowchart of FIGS. 9A and 9B.

The duty cycle monitor circuitry 165 is coupled to the clock circuitry 604, the step incrementor 608, the motor control characteristics 612, and the first current driver control circuitry 624. In the example of FIG. 6, the duty cycle monitor circuitry 165 includes the step time counter 660, the drive time counter 664, the fast decay time counter 668, the duty cycle per step determination circuitry 672, the duty cycle averaging circuitry 676, the storage 678 further having the average duty cycle values 680, 682, 684, the error amplifier circuitry 686, the low pass filter 688, and the threshold circuitry 690. The duty cycle monitor circuitry 165 sense changes in a load of the stepper motor 110. The duty cycle monitor circuitry 165 determines a duty cycle of one or more steps responsive to durations of the mode of operations. The duty cycle monitor circuitry 165 determines changes in the load of the stepper motor 110 by comparing a determined cycle to previous duty cycles for similar operations.

The step time counter 660 has a first input coupled to the clock circuitry 604 and a second input coupled to the step incrementor 608. The step time counter 660 receives the reference clock and the step pulse train. The step time counter 660 determines a total duration ($\Sigma T_{step}$) of a step using the reference clock and the step pulse train. In some examples, the step time counter 660 counts a number of cycles of the reference clock between rising edges of the step pulse train. In such examples, the number of cycles of the reference clock represents the total duration of any given step. In other examples, the step time counter 660 counts a number of cycles of the reference clock across a plurality of pulses of the step pulse train. In such examples, the number of cycles represents the total duration of the plurality of steps of operation. The step time counter 660 has an output coupled to the duty cycle per step determination circuitry

672. The step time counter 660 supplies the total duration of the step to the duty cycle per step determination circuitry 672.

The drive time counter 664 has a first input coupled to the clock circuitry 604, a second input coupled to the step incrementor 608, and a third input coupled to the first current driver control circuitry 624. The drive time counter 664 receives the reference clock, the step pulse train from the step incrementor 608, and the selected mode of operation. The drive time counter 664 determines a drive duration ($\Sigma T_{on}$) when the first current driver circuitry 150 is in the drive mode of operation during one or more step(s). In some examples, the drive time counter 664 determines the drive duration as the interval of time that the mode of operation is the drive mode of operation between rising edges of the step pulse train. In such examples, the drive time counter 664 counts a number of cycles of the reference clock between rising edges of the step pulse train when the selected mode of operation is the drive mode of operation. The number of cycles of the reference clock represents the duration that the first current driver circuitry 150 is in the drive mode of operation. The drive time counter 664 has an output coupled to the duty cycle per step determination circuitry 672. The drive time counter 664 supplies the drive duration of the drive mode of operation for the one or more step(s) to the duty cycle determination circuitry 672.

The fast decay time counter 668 has a first input coupled to the clock circuitry 604, a second input coupled to the step incrementor 608, and a third input coupled to the first current driver control circuitry 624. The fast decay time counter 668 receives the reference clock, the step pulse train, and the selected mode of operation. The fast decay time counter 668 determines a fast decay duration ($\Sigma T_{fd}$) of when the first current driver circuitry 150 is in the fast decay mode of operation during one or more step(s). The fast decay time counter 668 determines the duration the mode of operation is the fast decay mode of operation between one or more rising edges of the step pulse train. In some examples, the fast decay time counter 668 counts a number of cycles of the reference clock between rising edges of the step pulse train when the selected mode of operation is the fast decay mode of operation. In such examples, the number of cycles of the reference clock represents the fast decay duration. The fast decay time counter 668 has an output coupled to the duty cycle per step determination circuitry 672. The fast decay time counter 668 supplies the fast decay duration to the duty cycle per step determination circuitry 672.

The duty cycle per step determination circuitry 672 has inputs coupled to the counters 660, 664, 668. The duty cycle per step determination circuitry 672 receives the total duration ($T_{step}$), the drive duration ($\Sigma T_{on}$), and the fast decay duration ($\Sigma T_{fd}$). The duty cycle per step determination circuitry 672 determines a duty cycle ($D_{n\_k}$) for one or more step(s) responsive to the total duration, the drive duration, and the fast decay duration. In some examples, the duty cycle per step determination circuitry 672 determines the duty cycle to be approximately equal to the difference between the drive duration and the fast decay duration divided by the total duration. In such examples, the duty cycle per step determination circuitry 672 uses Equation (3), below, to determine the power transferred to the stepper motor 110 during one or more step(s).

$$D_{n\_k} = \left( \sum T_{on} - \sum T_{fd} \right) / T_{step};$$

Equation (3)

The duty cycle per step determination circuitry 672 has an output coupled to duty cycle averaging circuitry 676 and the error amplifier circuitry 686. The duty cycle per step determination circuitry 672 supplies the determined duty cycle to the duty cycle averaging circuitry 676 and the error amplifier circuitry 686. In some examples, the duty cycle per step determination circuitry 672 is instantiated by programmable circuitry executing duty cycle per step determination instructions and/or other circuitry performing operations such as those represented by the flowchart of FIGS. 9A and 9B.

The duty cycle averaging circuitry 676 has a first input coupled to the step indexer circuitry 628, a second input coupled to the duty cycle per step determination circuitry 672, and a third input coupled to the storage 678. The duty cycle averaging circuitry 676 receives the indexer value, the determined duty cycle, and access to the average duty cycle values 680, 682, 684. The duty cycle averaging circuitry 676 selects one of the average duty cycle values 680, 682, 684 responsive to the indexer value. The average duty cycle values 680, 682, 684 represent previously determined duty cycles for one or more indexer value(s) as averages. The average duty cycle values 680, 682, 684 correspond to operations of controller circuitry 155. In some examples, each of the average duty cycle values 680, 682, 684 each represent duty cycles for one or more target currents. In such examples, the duty cycle averaging circuitry 676 selects the one of the average duty cycle values 680, 682, 684 corresponding to the operations at the indexer value.

The duty cycle averaging circuitry 676 has an output coupled to the error amplifier circuitry 686. The duty cycle averaging circuitry 676 supplies the selected one of the average duty cycle values 680, 682, 684 to the error amplifier circuitry 686. The duty cycle averaging circuitry 676 combines the determine duty cycle and the selected one of the average duty cycle values 680, 682, 684 responsive to supplying the one of the average duty cycle values 680, 682, 684 to the error amplifier circuitry 686. In some examples, the duty cycle averaging circuitry 676 averages the determined duty cycle with the selected one of the average duty cycle values 680, 682, 684 to generate a moving average. The duty cycle averaging circuitry 676 updates the selected one of the average duty cycle values 680, 682, 684 responsive to the combination. In some examples, the duty cycle averaging circuitry 676 is instantiated by programmable circuitry executing duty cycle averaging instructions and/or other circuitry performing operations such as those represented by the flowchart of FIGS. 9A and 9B.

The error amplifier circuitry 686 has a first input coupled to the duty cycle per step determination circuitry 672 and a second input coupled to the duty cycle averaging circuitry 676. The error amplifier circuitry 686 receives the determined duty cycle and the average duty cycle. The error amplifier circuitry 686 compares the determined duty cycle and the average duty cycle. The error amplifier circuitry 686 determines a duty cycle difference ($D_{DIFF}$) as the difference between the determined duty cycle and the average duty cycle. The error amplifier circuitry 686 has an output coupled to the low pass filter 688. The error amplifier circuitry 686 supplies the duty cycle difference to the low pass filter 688. In some examples, the error amplifier circuitry 686 is instantiated by programmable circuitry executing error amplifier instructions and/or other circuitry performing operations such as those represented by the flowchart of FIGS. 9A and 9B.

The low pass filter 688 has an input coupled to the error amplifier circuitry 686. The low pass filter 688 receives the duty cycle difference. The low pass filter 688 has a cut off frequency, which determines frequencies allowed to pass the low pass filter 688. The low pass filter 688 reduces changes in the duty cycle difference that occur at frequencies greater than the cutoff frequency. The low pass filter 688 reduces relatively high-speed changes, such as noise, from contributing to a total error. The low pass filter 688 has an output coupled to the threshold circuitry 690. The low pass filter 688 supplies the filtered duty cycle difference to the threshold circuitry 690.

The threshold circuitry 690 has an input coupled to the low pass filter 688. The threshold circuitry 690 receives the filtered duty cycle difference. The threshold circuitry 690 determines if the filtered duty cycle difference has a positive or negative magnitude. When the filtered duty cycle difference has a negative magnitude, the threshold circuitry 690 determines the determined duty cycle is less than the average duty cycle. In such examples, the threshold circuitry 690 determines that the load applied to the stepper motor 110 has remained the same and/or decreased. In some examples, the threshold circuitry 690 determines a feedforward error of approximately zero responsive to the filtered duty cycle difference having a negative magnitude.

When the filtered duty cycle difference has a positive magnitude, the threshold circuitry 690 determines the determined duty cycle is greater than the average duty cycle. In such examples, the threshold circuitry 690 determines that the load applied to the stepper motor 110 has increased. The threshold circuitry 690 compares the filtered duty cycle difference to a threshold difference. The threshold difference represents a minimum change in the load of the stepper motor 110 that warrants changing the peak current value 620. For example, power supplied by the current driver circuitry 150, 160 may be enough to allow relatively small changes in the load of stepper motor 110. In such examples, excessive increases in the load of the stepper motor 110 needs additional power to compensate, prevent loss of positioning, and/or prevent stall. The threshold circuitry 690 generates a feedforward error responsive to the filtered duty cycle difference being greater than the threshold difference. However, when the filtered duty cycle is less than the threshold difference, the threshold circuitry 690 sets the feedforward error to approximately zero.

The threshold circuitry 690 has an output coupled to the peak current control circuitry 694. The threshold circuitry 690 supplies the feedforward error to the peak current control circuitry 694. In some examples, the threshold circuitry 690 is instantiated by programmable circuitry executing threshold instructions and/or other circuitry performing operations such as those represented by the flowchart of FIGS. 9A and 9B.

The peak current control circuitry 694 has an input coupled to the threshold circuitry 690. The peak current control circuitry 694 receives the feedforward error. The peak current control circuitry 694 determines a modified peak current value responsive to a non-zero feedforward error. In some examples, the peak current control circuitry 694 determines a modified peak current value using the peak current value 620 and the feedforward error. The peak current control circuitry 694 has an output coupled to the peak current value 620. The peak current control circuitry 694 adjusts the peak current value 620 responsive to the determined modified peak current value. In some examples, the peak current control circuitry 694 is instantiated by programmable circuitry executing peak current control instructions and/or other circuitry performing operations such as those represented by the flowchart of FIGS. 9A and 9B.

Advantageously, updating the peak current value 620 adjusts the current driver control circuitry 624, 652. Advantageously, the controller circuitry 155 adjusts a supply of power to the stepper motor 110 responsive to variations in the duty cycle of one or more steps. Advantageously, the duty cycle monitor circuitry 165 may determine changes in the load of the stepper motor 110 in as little as a single step of the stepper motor 110.

Figure 7:
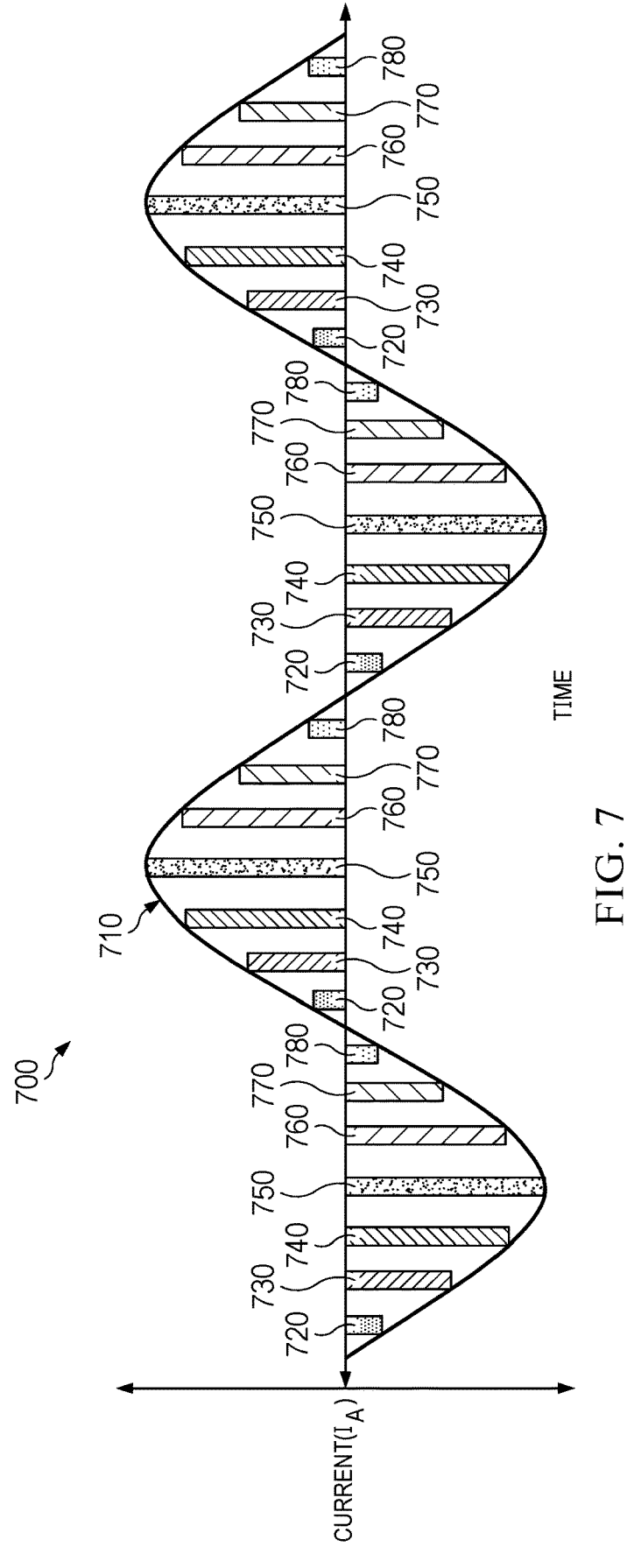
FIG. 7 is a timing diagram of an example windowing operation of the step duty monitor circuitry of FIG. 6.

FIG. 7 is a timing diagram 700 of an example windowing operation of the duty cycle monitor circuitry 165 of FIGS. 1, 2, and 6. In the example of FIG. 7, the timing diagram 700 includes an example ideal current 710, first example operations 720, second example operations 730, third example operations 740, fourth example operations 750, fifth example operations 760, sixth example operations 770, and seventh example operations 780.

The ideal current 710 represents an ideal current from one of the current driver circuitry 150, 160 of FIGS. 1, 2, and 3. The ideal current 710 is a sinusoidal waveform, which has a frequency approximately equal to one divided by 2 times pi ($\pi$) omega ($\omega$). Advantageously, the ideal current 710 is a periodic sinusoidal waveform.

The operations 720, 730, 740, 750, 760, 770, 780 represent one or more steps of the controller circuitry 155 of FIGS. 1, 2, and 6. The operations 720, 730, 740, 750, 760, 770, 780 generate the ideal current 710. Each of the operations 720, 730, 740, 750, 760, 770, 780 are periodically repeated responsive to the ideal current being sinusoidal waveform. In example operations, the duty cycle monitor circuitry 165 may compare duty cycles of any instance of any of the operations 720, 730, 740, 750, 760, 770, 780 with a recurrence of the same one of the operations 720, 730, 740, 750, 760, 770, 780 at a later time. For example, determined duty cycles at any occurrence of the first operations 720 may be compared to determine changes in the load of the stepper motor 110. Advantageously, the duty cycle monitor circuitry 165 may begin to sense changes in the load of the stepper motor 110 after a first occurrence of any of the operations 720, 730, 740, 750, 760, 770, 780. In some examples, operations within a half cycle of the ideal current 710 may be compared to operations with similar currents. For example, the operations 720, 780 may be used to sense changes in the load of the stepper motor 110 when the target currents of the operations 720, 780 are approximately equal.

Figure 8:
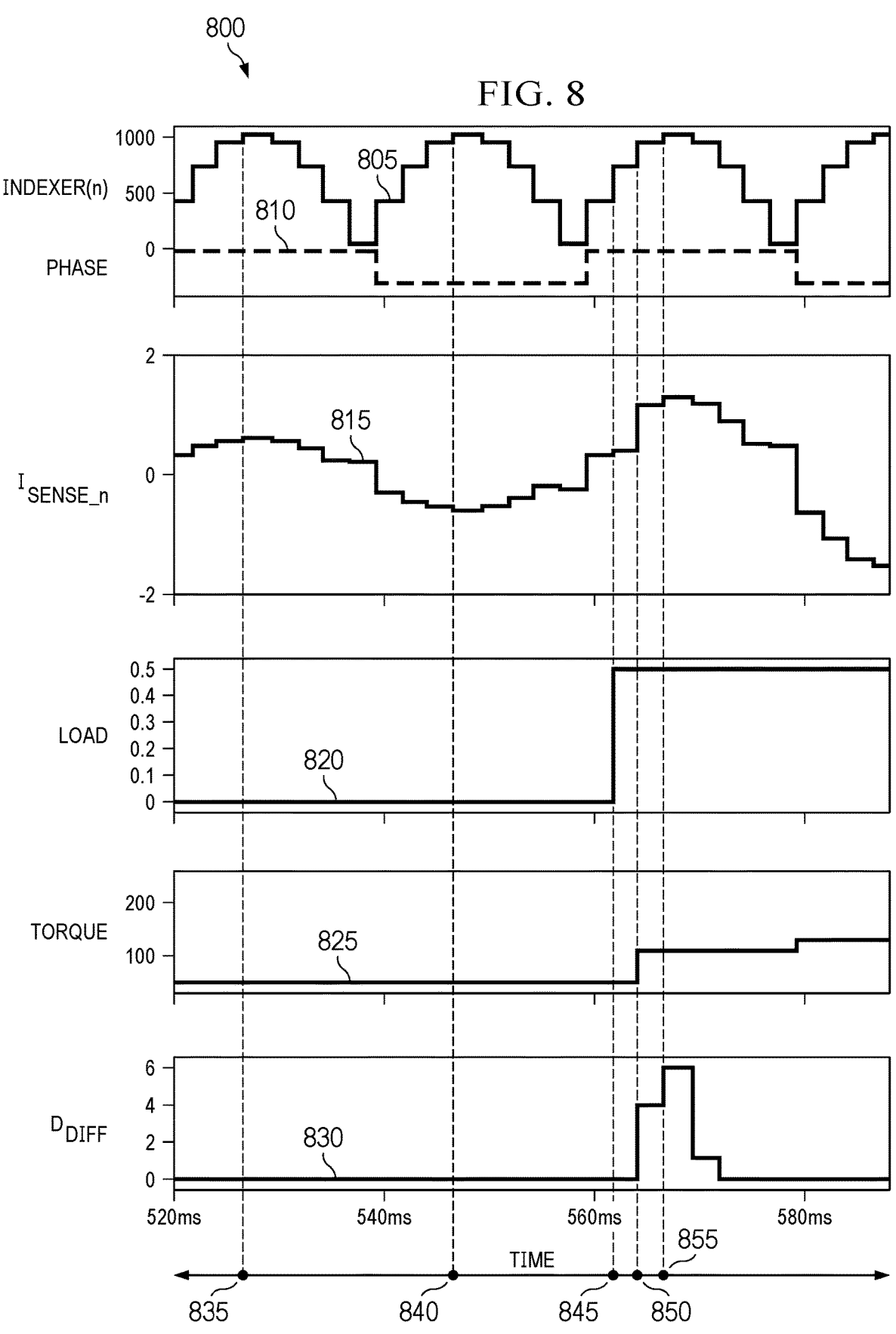
FIG. 8 is a timing diagram of an example operation of the step duty monitor circuitry of FIG. 6.

FIG. 8 is a timing diagram 800 of an example operation of the duty cycle monitor circuitry 165 of FIGS. 1, 2, and 6. In the example of FIG. 8, the timing diagram 800 includes an example indexer plot 805, an example phase plot 810, an example sense current plot 815, an example load plot 820, an example torque plot 825, and an example duty cycle difference plot 830.

The indexer plot 805 represents the indexer value of the step indexer circuitry 628 of FIG. 6. The step indexer circuitry 628 adjusts the indexer value responsive to pulses of the step pulse train 430 of FIG. 4 from the step incrementor 608 of FIG. 6. The phase plot 810 represents a phase of the indexer value from the step indexer circuitry 628. The value of the phase plot 810 represents whether magnitudes of the indexer value are positive or negative. In some examples, the phase plot 810 represents the sign bit of the indexer value. In such examples, the step indexer circuitry 628 adjusts the value of the sign bit every half cycle of the sinusoidal waveform.

The sense current plot 815 represents the current supplied by the current driver circuitry 150 of FIGS. 1, 2, and 3 responsive to the operations of the controller circuitry 155 of FIGS. 1, 2, and 6. In example operations, the inductor current determination circuitry 636 of FIG. 6 determines a magnitude of the sense current plot 815 for a given time. In such examples, the first current driver control circuitry 624 may adjust the current driver circuitry 150 responsive to variations in the sense current plot 815.

The load plot 820 represents the mechanical load applied to the stepper motor 110 of FIGS. 1 and 2. In some examples, increases in the magnitude of the load plot 820 correspond to increases in the mechanical load being applied. In such examples, the controller circuitry 155 may need to adjust a supply of power to the stepper motor to compensate for some increases in the load plot 820.

The torque plot 825 represents the mechanical energy supplied by the stepper motor 110. When the mechanical load applied to the stepper motor 110 increases, the controller circuitry 155 needs to increase a supply of power by the current driver circuitry 150 to prevent stall and/or positioning remains accurate.

The duty cycle difference plot 830 represents the duty cycle difference determined by the error amplifier circuitry 686 of FIG. 6. When the magnitude of the duty cycle difference plot 830 is negative, the duty cycle monitor circuitry 165 determines the mechanical load applied to the stepper motor 110 has decreased. When the magnitude of the duty cycle difference plot 830 is positive, the duty cycle monitor circuitry 165 determines the mechanical load applied to the stepper motor 110 has increased. The threshold circuitry 690 of FIG. 6 determines that increases in the magnitude of the duty cycle difference plot 830 warrant adjusting the peak current value 620 of FIG. 6 responsive to the magnitude of the duty cycle difference plot 830 being greater than a threshold.

At a first time 835, the indexer plot 805 begins a step with a peak current value. At the first time 835, the sense current plot 815 represents the peak current value 620 as a first peak value. At a second time 840, the indexer plot 805 begins a step with the peak current value. However, at the second time 840, the magnitude of the sense current plot 815 is a negative value responsive to the value of the phase plot 810.

At a third time 845, the load plot 820 increases. Beginning at the third time 845, the power supplied to the stepper motor 110 by the sinusoidal waveform of the peak current value 620 may no longer be able to continue to rotate the axle 145 of FIG. 1. After the third time 845, the drive duration of the drive time counter 664 increases responsive to the back EMF generated by increasing the mechanical load.

Between the third time 845 and a fourth time 850, the duty cycle monitor circuitry 165 senses the change in the load plot 820 at the third time 845 responsive to the variation in the duty cycle resulting from the increases in the drive duration. For example, the error amplifier circuitry 686 of FIG. 6 compares the duty cycle at the fourth time 850 to previous duty cycles of similar target currents. In such an example, the error amplifier circuitry 686 generates increases the magnitude of the duty cycle difference plot 830. At the fourth time 850, the duty cycle monitor circuitry 165 generates a feedforward error responsive to the magnitude of the duty cycle difference plot 830 being greater than a threshold. At approximately the fourth time 850, the peak current control circuitry 694 increases the peak current value 620 to a second peak value. At approximately the fourth time 850, the torque plot 825 increases responsive to the increase of the peak current value 620 from the first peak value to the second peak value.

At a fifth time 855, the indexer plot 805 begins a step with a peak current value. At the fifth time 855, the sense current plot 815 represents the peak current value 620 as the second peak value from the fourth time 850. Advantageously, the duty cycle monitor circuitry 165 is capable of sensing changes in the mechanical load applied to the stepper motor 110 using a single step.

9A and 9B form a flowchart representative of example machine-readable instructions and/or example operations 900 that may be executed, instantiated, and/or performed using an example programmable circuitry implementation of the duty cycle monitor circuitry 165 of FIGS. 1, 2, and 6 and/or more generally the controller circuitry 155 of FIGS. 1, 2, and 6. The example operations 900 begin at Block 905, at which the step current determination circuitry 632 of FIG. 6 determines an indexer coefficient for a motor step. In some examples, the step current determination circuitry 632 determines the indexer coefficient using Equation (1), above.

The step current determination circuitry 632 determines a target current for the motor step using the indexer coefficient. (Block 910). In some examples, the step current determination circuitry 632 determines the target current for the motor step using Equation (2), above.

The inductor current determination circuitry 636 of FIG. 6 determines a current supplied to an inductance by current driver circuitry. (Block 915). In some examples, the inductor current determination circuitry 636 determines the current supplied to the first inductance 130 of FIGS. 1 and 2 responsive to the output of one or more of the current sense circuitry 315, 325, 335, 345 of FIG. 3. In such examples, the inductor current determination circuitry 636 may determine the current by combining and/or comparing currents flowing through the transistors 310, 320, 330, 340 of FIG. 3. For example, when the first current path 375 of FIG. 3 is active (e.g., the current driver circuitry 150 of FIGS. 1, 2, and 3 is in a drive mode) the inductor current determination circuitry 636 determines the current through the first inductance 130 responsive to the currents through one or both of the transistors 310, 340.

The PID control circuitry 640 of FIG. 6 determines a control variable using the target current and the current being supplied. (Block 920). In some examples, the PID control circuitry 640 determines an error value to be approximately equal to the difference between the target current and the current being supplied. In such examples, the PID control circuitry 640 determines the control variable responsive to implementing the error value with proportional, integral, and derivative elements. Advantageously, changes in the peak current value 620 of FIG. 6 are reflected in the target current, which adjusts the control variable.

The mode of operation determination circuitry 644 of FIG. 6 controls the current driver circuitry using the control variable. (Block 925). In some examples, the mode of operation determination circuitry 644 determines whether to adjust a mode of operation of the current driver circuitry 150 responsive to the control variable. For example, the mode of operation determination circuitry 644 may adjust the mode of operation to a drive mode responsive to the control variable representing an error value greater than a threshold value. The mode of operation determination circuitry 644 supplies (or indicates) the selected mode of operation to the first drive operation control circuitry 648 of FIG. 6 to turn on and off one or more of the transistors 310, 320, 330, 340 to implement the selected mode of operation.

The drive time counter 664 of FIG. 6 determines a first duration that the current driver circuitry is in a drive mode during the motor step. (Block 930). In some examples, the drive time counter 664 determines the drive duration as an interval of time that the first current driver circuitry 150 is in the drive mode for one or more step(s). For example, the drive time counter 664 counts a number of cycles of the reference clock from the clock circuitry 604 of FIG. 6 during the drive duration.

The fast decay time counter 668 of FIG. 6 determines a second duration that the current driver circuitry is in a fast decay mode during the motor step. (Block 935). In some examples, the fast decay time counter 668 determines the fast decay duration as an interval of time that the first current driver circuitry 150 is in the fast decay mode for one or more step(s). For example, the fast decay time counter 668 counts a number of cycles of the reference clock from the clock circuitry 604 during the fast decay duration.

The step time counter 660 of FIG. 6 determines a total duration of the motor step. (Block 940). In some examples, the step time counter 660 determines the total duration as an interval of time between edges of the pulses of the step pulse train 430 from the step incrementor 608. In such examples, the step time counter 660 may determine the total duration to be an interval of a plurality of steps. For example, the step time counter 660 may determine the total duration to be an interval between two pulses of the step pulse train 430. In such examples, the total duration may be one-thousand responsive to the frequency of the reference clock from the clock circuitry 604 being approximately one-thousand times the frequency of the step pulse train 430.

The duty cycle per step determination circuitry 672 of FIG. 6 determines a duty cycle of the motor step. (Block 945). In some examples, the duty cycle per step determination circuitry 672 determines the duty cycle for the motor step using Equation (3), above.

The duty cycle per step determination circuitry 672 determines if duty cycles for a window of motor steps have been determined. (Block 950). In some examples, the duty cycle per step determination circuitry 672 determines duty cycles for a plurality of steps of the step pulse train 430. In such examples, the duty cycle per step determination circuitry 672 determines the total duty cycle for the plurality of steps.

If the duty cycle per step determination circuitry 672 determines that duty cycles have not been determined for all steps of a window of motor steps (e.g., Block 950 returns a result of NO), the step incrementor 608 increments the motor step to a next motor step. (Block 955). In some examples, the step incrementor 608 generates a pulse on the step pulse train 430. In such examples, responsive to the pulse, the step indexer circuitry 628 of FIG. 6 increments the indexer value. Control proceeds to return to Block 905 with the next motor step.

Figure 9B:
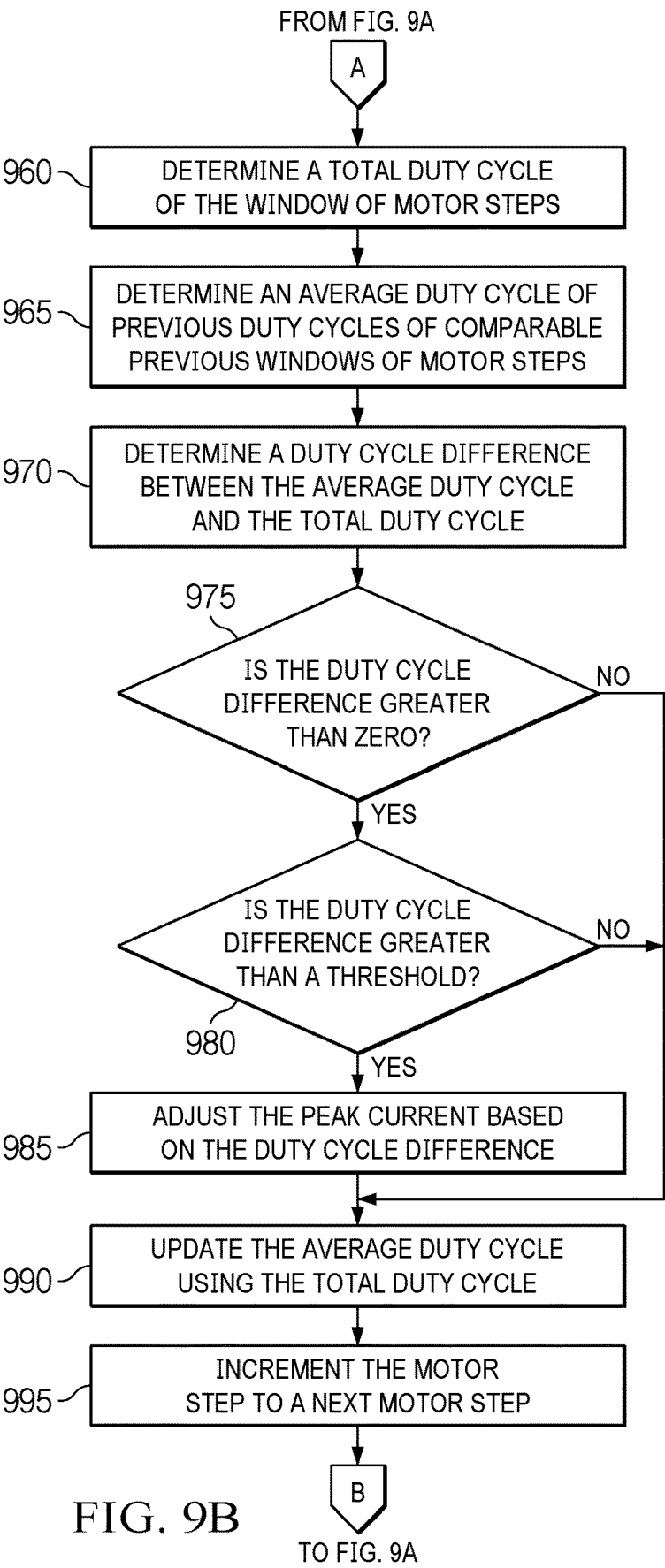

Turning now to FIG. 9B, if the duty cycle per step determination circuitry 672 determines that duty cycles have been determined for all steps of a window of motor steps (e.g., Block 950 returns a result of YES), the duty cycle per step determination circuitry 672 determines a total duty cycle for the window of motor steps. (Block 960). In some examples, the duty cycle per step determination circuitry 672 determines the duty cycle for each of the steps of the window of steps using Equation (3), above. In such examples, the duty cycle per step determination circuitry 672 combines the duty cycle of each step.

The duty cycle averaging circuitry 676 of FIG. 6 determines an average duty cycle of previous duty cycles of comparable previous windows of motor steps. (Block 965).

In some examples, the duty cycle averaging circuitry 676 uses the indexer value from the step indexer circuitry 628 to select one of the average duty cycle values 680, 682, 684 of FIG. 6. In such examples, the selected one of the average duty cycle values 680, 682, 684 correspond to operations of the controller circuitry 155 similar to the operations during the window of steps. For example, the magnitudes of target currents during the selected one of the average duty cycle values 680, 682, 684 are approximately the same as the magnitudes of the target currents during the window of steps. In such an example, the duty cycle averaging circuitry 676 may compare any subsequent occurrences of any one of the operations 720, 730, 740, 750, 760, 770, 780 of FIG. 7 with an average of previous occurrences of the one of the operations 720, 730, 740, 750, 760, 770, 780.

The error amplifier circuitry 686 of FIG. 6 determines a duty cycle difference between the average duty cycle and the total duty cycle. (Block 970). In some examples, the error amplifier circuitry 686 determines the duty cycle difference as the difference between the average duty cycle and the total duty cycle. In such examples, the duty cycle difference may be supplied to the low pass filter 688 of FIG. 6, which may apply a truncation factor. The truncation factor may simplify the duty cycle difference prior to comparison.

The threshold circuitry 690 of FIG. 6 determines if the duty cycle difference is greater than zero. (Block 975). In some examples, the threshold circuitry 690 determines the duty cycle difference represents a decrease in the load of the stepper motor 110 responsive to negative magnitudes of the duty cycle difference. In such examples, the threshold circuitry 690 determines that the controller circuitry 155 accurately controls the stepper motor 110 for such a load.

If the threshold circuitry 690 determines the duty cycle difference is greater than zero (e.g., Block 975 returns a result of YES), the threshold circuitry 690 determines if the duty cycle difference is greater than a threshold. (Block 980). In some examples, the threshold circuitry 690 determines the duty cycle difference represents an increase in the load of the stepper motor 110 responsive to positive magnitudes of the duty cycle difference. In such examples, the threshold circuitry 690 may determine that the controller circuitry 155 needs to increase the supply of power to compensate for the increase in load of the stepper motor 110.

If the threshold circuitry 690 determines the duty cycle difference is greater than the threshold (e.g., Block 980 returns a result of YES), the peak current control circuitry 694 of FIG. 6 adjusts the peak current using the duty cycle difference. (Block 985). In some examples, the threshold circuitry 690 determines to increase the supply of power to the stepper motor 110 responsive to the duty cycle difference being greater than the threshold. In such examples, the peak current control circuitry 694 increases the peak current value 620 to modify the current being supplied by the current driver circuitry 150, 160 of FIGS. 1, 2, and 3. In example operations, the step current determination circuitry 632 adjusts the target current to compensate for changes to the peak current value 620. Advantageously, the controller circuitry 155 can adjust the supply of power to the stepper motor 110 to compensate for changes in the load of the stepper motor 110. Advantageously, adjusting the supply of power decreases a likelihood of stalling and/or loss of positioning of the stepper motor 110.

If the threshold circuitry 690 determines the duty cycle difference is not greater than zero (e.g., Block 975 returns a result of NO), the threshold circuitry 690 determines the duty cycle difference is not greater than the threshold (e.g., Block 980 returns a result of NO), or operations of Block 985 occur, the duty cycle averaging circuitry 676 updates the average duty cycle using the total duty cycle. (Block 990). In some examples, the duty cycle averaging circuitry 676 averages the selected one of the average duty cycle values 680, 682, 684 with the determined duty cycle to generate an updated average duty cycle. In such examples, the duty cycle averaging circuitry 676 sets the selected one of the average duty cycle values 680, 682, 684 to reflect the updated average duty cycle.

The step incrementor 608 increments the motor step to a next motor step. (Block 995). In some examples, the step incrementor 608 generates a pulse on the step pulse train 430. In such examples, responsive to the pulse, the step indexer circuitry 628 of FIG. 6 increments the indexer value. Control proceeds to return to Block 905 with the next motor step.

Although example methods are described with reference to the flowchart illustrated in FIGS. 9A and 9B, many other methods of implementing the duty cycle monitor circuitry 165 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

While an example manner of implementing the controller circuitry 155 of FIG. 1 is illustrated in FIG. 6, one or more of the elements, processes, and/or devices illustrated in FIG. 6 may be combined, divided, re-arranged, omitted, eliminated, and/or implemented in any other way. Further, the example clock circuitry 604, the example step incrementor 608, the example motor control characteristics 612, the example number of steps in a quadrant value 616, the example peak current value 620, the first example current driver control circuitry 624, the example step indexer circuitry 628, the example step current determination circuitry 632, the example inductor current determination circuitry 636, the example PID control circuitry 640, the example mode of operation determination circuitry 644, the first example drive operation control circuitry 648, the second example current driver control circuitry 652, the second example drive operation control circuitry 656, the example step time counter 660, the example drive time counter 664, the example fast decay time counter 668, the example duty cycle per step determination circuitry 672, the example duty cycle averaging circuitry 676, the example storage 678, the first example average value 680, the second example average value 682, the third example average value 684, the example error amplifier circuitry 686, the example low pass filter 688, the example threshold circuitry 690, and the example peak current control circuitry 694 and/or, more generally, the example controller circuitry 155 of FIG. 6, may be implemented by hardware alone or by hardware in combination with software and/or firmware. Thus, for example, any of the example clock circuitry 604, the example step incrementor 608, the example motor control characteristics 612, the example number of steps in a quadrant value 616, the example peak current value 620, the first example current driver control circuitry 624, the example step indexer circuitry 628, the example step current determination circuitry 632, the example inductor current determination circuitry 636, the example PID control circuitry 640, the example mode of operation determination circuitry 644, the first example drive operation control circuitry 648, the second example current driver control circuitry 652, the second example drive operation control circuitry 656, the example step time counter 660, the example drive time counter 664, the example fast decay time counter 668, the example duty cycle per step determination circuitry 672, the example duty cycle averaging circuitry 676, the example storage 678, the first example average value 680, the second example average value 682, the third example average value 684, the example error amplifier circuitry 686, the example low pass filter 688, the example threshold circuitry 690, and the example peak current control circuitry 694, and/or, more generally, the example controller circuitry 155, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example controller circuitry 155 of FIG. 6 may include one or more elements, processes, and/or devices in addition to, or instead of, those illustrated in FIG. 6, and/or may include more than one of any or all of the illustrated elements, processes and devices.

Flowchart(s) representative of example machine-readable instructions, which may cause programmable circuitry to implement and/or instantiate the controller circuitry 155 of FIG. 6 and/or representative of example operations which may be performed by programmable circuitry to implement and/or instantiate the controller circuitry 155 of FIG. 6, are shown in FIGS. 9A and 9B. The machine-readable instructions may be one or more executable programs or portion(s) of one or more executable programs for execution by programmable circuitry such as the programmable circuitry 1012 shown in the example processor platform 1000 discussed below in connection with FIG. 10 and/or may be one or more function(s) or portion(s) of functions to be performed by the example programmable circuitry (e.g., an FPGA) discussed below in connection with FIGS. 11 and/or 12. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9A and 9B, many other methods of implementing the example controller circuitry 155 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9A and 9B may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

Figure 10:
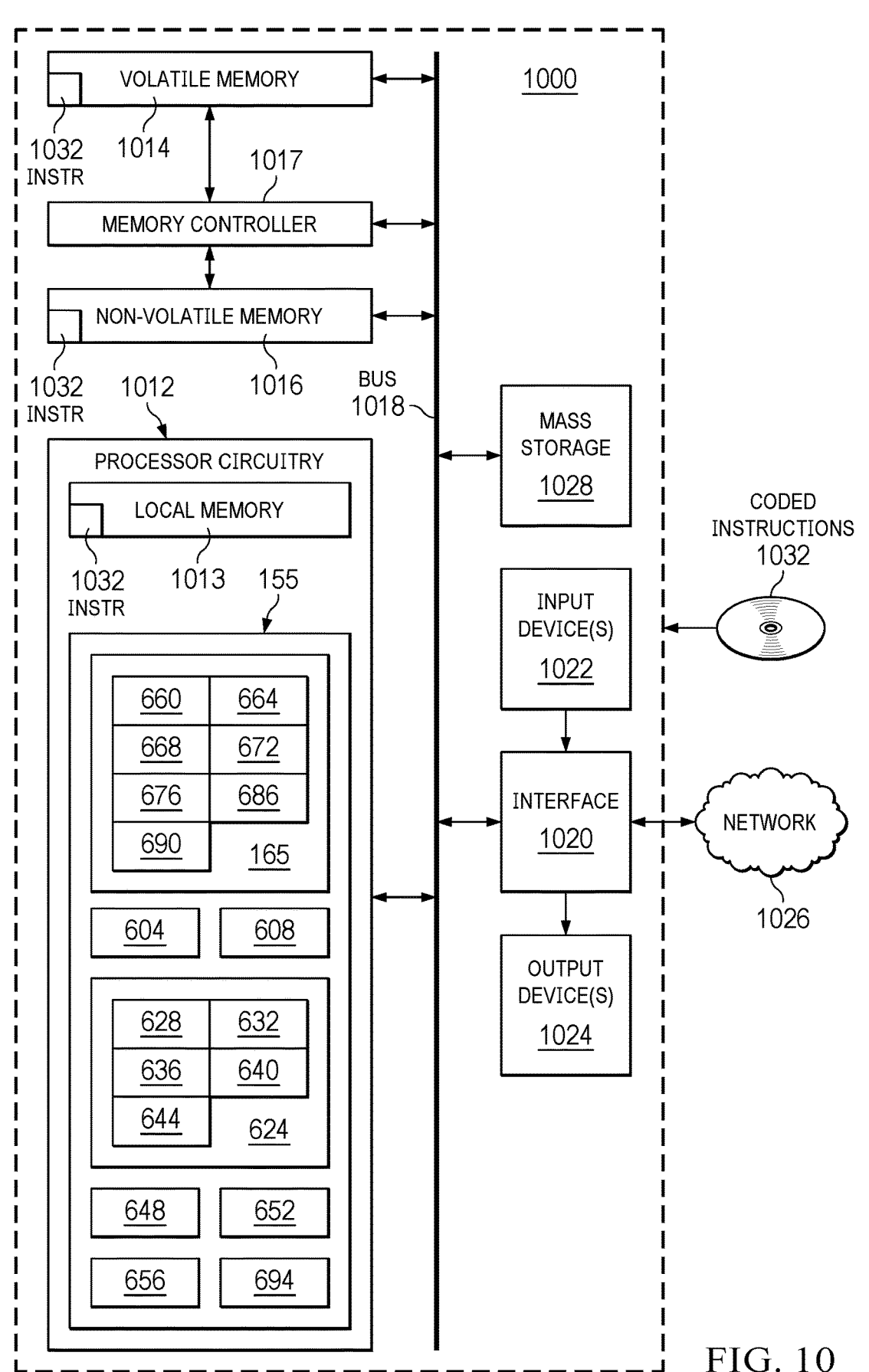
FIG. 10 is a block diagram of an example processing platform including programmable circuitry structured to execute, instantiate, and/or perform the example machine-readable instructions and/or perform the example operations of FIGS. 9A and 9B to implement the controller circuitry of FIG. 6.

FIG. 10 is a block diagram of an example programmable circuitry platform 1000 structured to execute and/or instantiate the example machine-readable instructions and/or the example operations of FIGS. 9A and 9B to implement the controller circuitry 155 of FIG. 6. The programmable circuitry platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements example clock circuitry 604, the example step incrementor 608, the first example current driver control circuitry 624, the example step indexer circuitry 628, the example step current determination circuitry 632, the example inductor current determination circuitry 636, the example PID control circuitry 640, the example mode of operation determination circuitry 644, the first example drive operation control circuitry 648, the second example current driver control circuitry 652, the second example drive operation control circuitry 656, the example step time counter 660, the example drive time counter 664, the example fast decay time counter 668, the example duty cycle per step determination circuitry 672, the example duty cycle averaging circuitry 676, the example storage 678, the first example average value 680, the second example average value 682, the third example average value 684, the example error amplifier circuitry 686, the example low pass filter 688, the example threshold circuitry 690, and the example peak current control circuitry 694.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1032, which may be implemented by the machine-readable instructions of FIGS. 9A and 9B, may be stored in the mass storage device 1028, in the volatile memory 1014, in the non-volatile memory 1016, and/or on at least one non-transitory computer readable storage medium such as a CD or DVD which may be removable.

Figure 11:
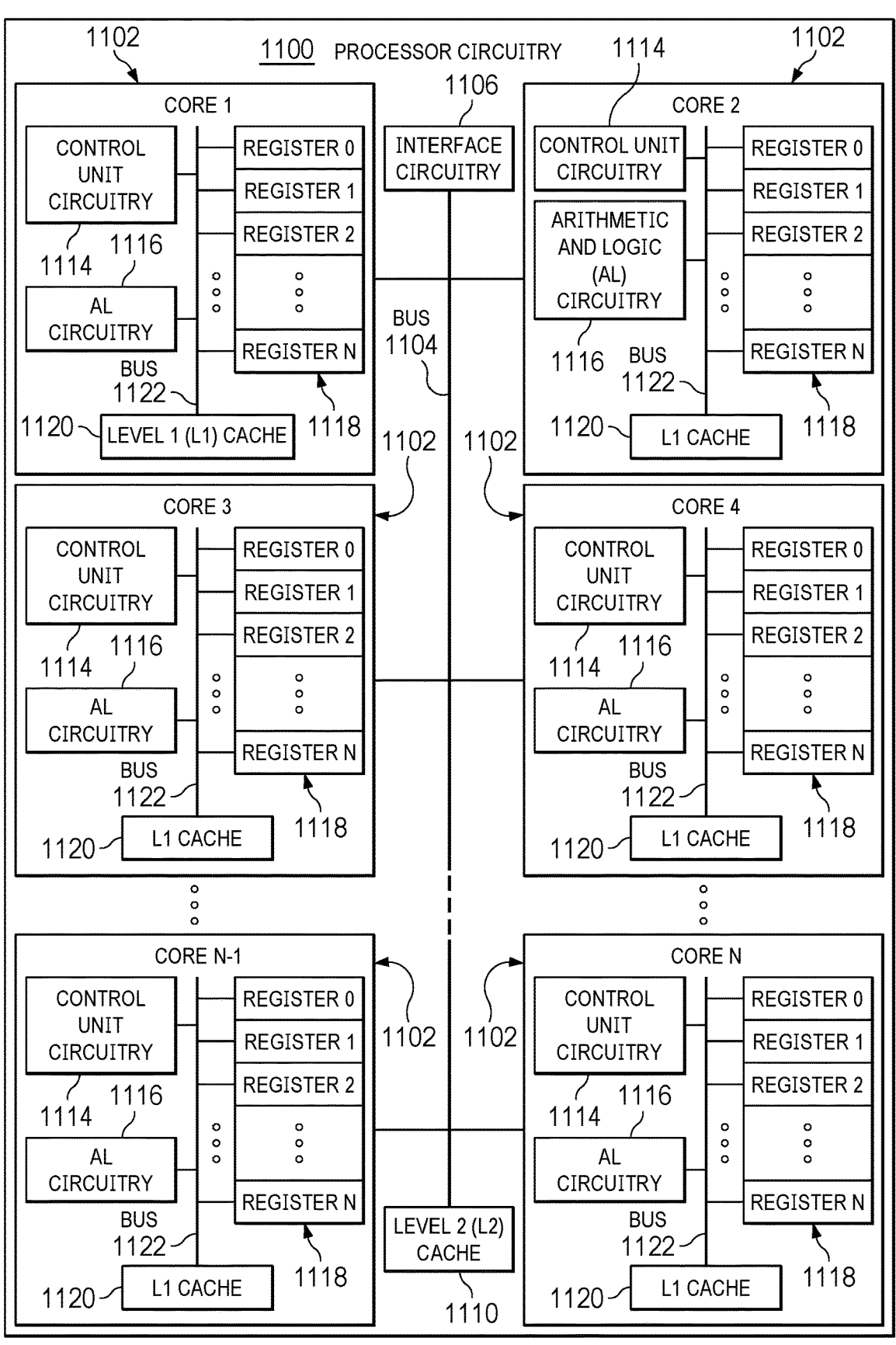
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowcharts of FIGS. 9A and 9B to effectively instantiate the circuitry of FIG. 6 a as logic circuits to perform operations corresponding to those machine-readable instructions. In some such examples, the circuitry of FIG. 6 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine-readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine-readable instructions and/or operations represented by the flowcharts of FIGS. 9A and 9B.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer-based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
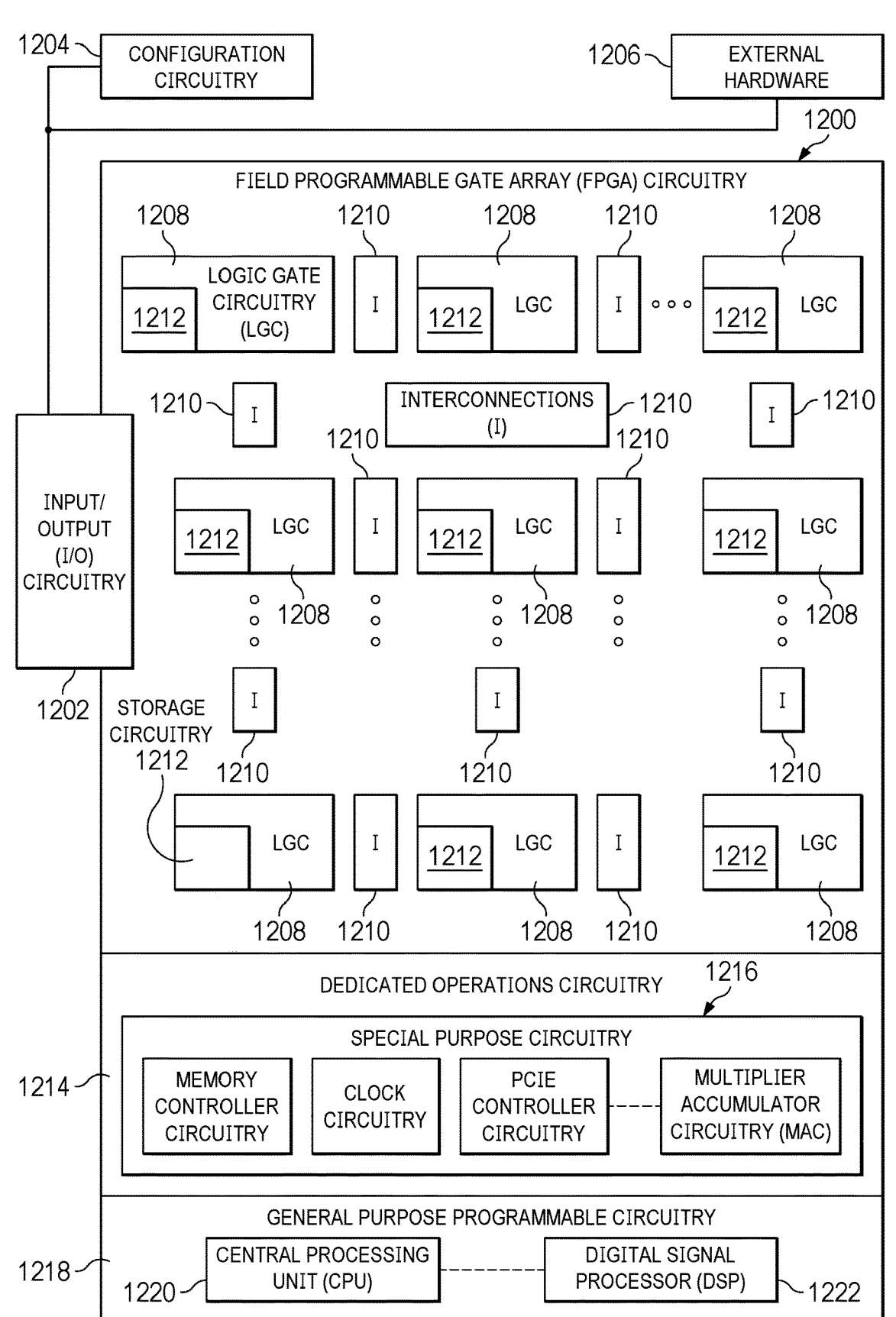
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine-readable instructions. However, once configured, the FPGA circuitry 1200 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine-readable instructions represented by the flowchart(s) of FIGS. 9A and 9B but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 9A and 9B. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 9A and 9B. As such, the FPGA circuitry 1200 may be configured and/or structured to effectively instantiate some or all of the operations/functions corresponding to the machine-readable instructions of the flowchart(s) of FIGS. 9A and 9B as dedicated logic circuits to perform the operations/functions corresponding to those software instructions in a dedicated manner analogous to an ASIC. Therefore, the FPGA circuitry 1200 may perform the operations/functions corresponding to the some or all of the machine-readable instructions of FIGS. 9A and 9B faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry

1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine-readable instructions of FIGS. 9A and 9B and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine-readable instructions represented by the flowchart(s) of FIGS. 9A and 9B to perform first operation(s)/function(s), the FPGA circuitry 1200 of FIG. 12 may be configured and/or structured to perform second operation(s)/function(s) corresponding to a second portion of the machine-readable instructions represented by the flowcharts of FIGS. 9A and 9B, and/or an ASIC may be configured and/or structured to perform third operation(s)/function(s) corresponding to a third portion of the machine-readable instructions represented by the flowcharts of FIGS. 9A and 9B.

It should be understood that some or all of the circuitry of FIG. 6 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 6 may be instantiated, for example, in one or more threads executing concurrently and/or in series. For example, the microprocessor 1100 of FIG. 11 may execute machine-readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 6 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the described examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions and/or empirical values that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

What is claimed is:

1. An apparatus comprising:
current driver circuitry capable of supplying power to a stepper motor; and
controller circuitry coupled to the current driver circuitry, the controller circuitry capable of:
determining a first duty cycle of power transferred to the stepper motor by the current driver circuitry during an operation of the stepper motor, the operation to supply power using currents of a target magnitude;
determining an average duty cycle from previous duty cycles of power transferred to the stepper motor by the current driver circuitry during previous operations of the stepper motor, the previous operations to supply power using currents of the target magnitude; and
determining changes in a mechanical load applied to the stepper motor responsive to a comparison of the first duty cycle to the average duty cycle.

2. The apparatus of claim 1, wherein the controller circuitry is further capable of determining the first duty cycle using a first duration, a second duration, and a third duration, the first duration represents time that current is supplied in a first direction to the stepper motor, the second duration represents time that current is supplied in a second direction to the stepper motor, and the third duration represents a total duration of the operation, the first direction being opposite of the second direction.

3. The apparatus of claim 1, wherein the currents used to supply power during the operation are currents from a plurality of target currents and the currents used to supply power during previous operations are currents from the plurality of target currents.

4. The apparatus of claim 1, wherein the controller circuitry is further capable of determining the target magnitude using a peak current, a step number, and a number of steps in a quadrant of operations of the stepper motor, the peak current represents an amplitude, the step number corresponds to a portion of a sinusoidal waveform that supplies power to the stepper motor, the number of steps in a quadrant of operations of the stepper motor represents a number of the portions in a quarter cycle of the sinusoidal waveform.

5. The apparatus of claim 4, wherein the controller circuitry is further capable of modifying the peak current responsive to differences between the first duty cycle and the average duty cycle being greater than a threshold value.

6. The apparatus of claim 1, wherein the controller circuitry is further capable of determining an increase in the mechanical load applied to the stepper motor responsive to the first duty cycle being greater than the average duty cycle.

7. The apparatus of claim 1, wherein the controller circuitry is further capable of determining a decrease in the mechanical load applied to the stepper motor responsive to the first duty cycle being less than the average duty cycle.

8. At least one non-transitory computer readable storage medium comprising instructions that, when executed, cause programmable circuitry to at least:

determine a first duty cycle of power transferred to a stepper motor during an operation of the stepper motor, the first operation to supply power using currents of a target magnitude;

determine an average duty cycle from previous duty cycles of power transferred to the stepper motor during previous operations of the stepper motor, the previous operations to supply power using currents of the target magnitude; and determine changes in a mechanical load applied to the stepper motor responsive to a comparison of the first duty cycle to the average duty cycle.

9. The at least one non-transitory computer readable storage medium of claim 8, wherein the instructions are to cause the programmable circuitry to determine the first duty cycle responsive to determining a first duration, a second duration, and a third duration, the first duration represents time that current is supplied in a first direction to the stepper motor, the second duration represents time that current is supplied in a second direction to the stepper motor, and the third duration represents a total interval of the operation, the first direction being opposite of the second direction.

10. The at least one non-transitory computer readable storage medium of claim 8, wherein the currents used to supply power during the operation are currents from a plurality of target currents and the currents used to supply power during previous operations are currents from the plurality of target currents.

11. The at least one non-transitory computer readable storage medium of claim 8, wherein the instructions are to cause the programmable circuitry to determine the target magnitude using a peak current, a step number, and a number of steps in a quadrant of operations of the stepper motor, the peak current represents an amplitude, the step number corresponds to a portion of a sinusoidal waveform that supplies power to the stepper motor, the number of steps in a quadrant of operations of the stepper motor represents a number of the portions in a quarter cycle of the sinusoidal waveform.

12. The at least one non-transitory computer readable storage medium of claim 8, wherein the instructions are to cause the programmable circuitry to determine an increase in the mechanical load applied to the stepper motor responsive to differences between the first duty cycle and the average duty cycle being positive.

13. The at least one non-transitory computer readable storage medium of claim 8, wherein the instructions are to cause the programmable circuitry to determine a decrease in the mechanical load applied to the stepper motor responsive to differences between the first duty cycle and the average duty cycle being negative.

14. An apparatus comprising:

duty cycle determination circuitry capable of:

determining a first duty cycle of power transferred to a stepper motor during an operation of the stepper motor, the operation to supply power using currents of a target magnitude; and determining an average duty cycle from previous duty cycles of previous operations of the stepper motor, the previous operations to supply power using currents of the target magnitude;

an error amplifier capable of comparing the first duty cycle to the average duty cycle; and peak current control circuitry capable of adjusting a peak current of the supply of power responsive to a comparison of the first duty cycle to the average duty cycle.

15. The apparatus of claim 14, wherein the duty cycle determination circuitry is further capable of determining the first duty cycle responsive to determining a first duration, a second duration, and a third duration, the first duration represents time that current is supplied in a first direction to the stepper motor, the second duration represents time that current is supplied in a second direction to the stepper motor, and the third duration represents a total interval of the first operation, the first direction being opposite of the second direction.

16. The apparatus of claim 14, wherein the currents used to supply power during operations are currents from a plurality of target currents and the currents used to supply power during previous operations are currents from the plurality of target currents.

17. The apparatus of claim 14, further comprising current driver control circuitry capable of determining the target magnitude using the peak current, a step number, and a number of steps in a quadrant of operations of the stepper motor, the peak current represents an amplitude, the step number corresponds to a portion of a sinusoidal waveform that supplies power to the stepper motor, the number of steps in a quadrant of operations of the stepper motor represents a number of the portions in a quarter cycle of the sinusoidal waveform.

18. The apparatus of claim 17, wherein the current driver control circuitry is further capable of modifying the peak current responsive to differences between the first duty cycle and the average duty cycle being greater than a threshold value.

19. The apparatus of claim 14, further comprising threshold circuitry capable of determining an increase in a mechanical load applied to the stepper motor responsive to differences between the first duty cycle and the average duty cycle being positive.

20. The apparatus of claim 14, further comprising threshold circuitry capable of determining a decrease in a mechanical load applied to the stepper motor responsive to differences between the first duty cycle and the average duty cycle being negative.

* * * * *